US011242760B2

(12) United States Patent
Snider et al.

(10) Patent No.: US 11,242,760 B2
(45) Date of Patent: Feb. 8, 2022

(54) TURBINE ROTOR BLADE WITH INTEGRAL IMPINGEMENT SLEEVE BY ADDITIVE MANUFACTURE

(71) Applicant: General Electric Company, Schenectady, NY (US)

(72) Inventors: Zachary John Snider, Simpsonville, SC (US); Brad Wilson VanTassel, Greer, SC (US); Jeffrey Clarence Jones, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 136 days.

(21) Appl. No.: 16/749,143

(22) Filed: Jan. 22, 2020

(65) Prior Publication Data
US 2021/0222565 A1 Jul. 22, 2021

(51) Int. Cl.
*F01D 5/18* (2006.01)

(52) U.S. Cl.
CPC .............. *F01D 5/189* (2013.01); *F01D 5/18* (2013.01); *F01D 5/187* (2013.01); *F01D 5/188* (2013.01); F05D 2220/30 (2013.01); F05D 2240/30 (2013.01); F05D 2260/201 (2013.01)

(58) Field of Classification Search
CPC .......... F01D 5/187; F01D 5/189; F01D 5/188; F01D 5/18
See application file for complete search history.

(56) References Cited

U.S. PATENT DOCUMENTS

| 3,369,792 | A | * | 2/1968 | Kraimer | ................... | F01D 5/188 |
| | | | | | | 415/115 |
| 3,867,068 | A | * | 2/1975 | Corsmeier | .............. | F01D 5/147 |
| | | | | | | 416/97 R |
| 3,930,748 | A | * | 1/1976 | Redman | ................... | F01D 5/189 |
| | | | | | | 416/97 R |
| 4,616,976 | A | * | 10/1986 | Lings | ...................... | F01D 5/186 |
| | | | | | | 416/97 R |

(Continued)

FOREIGN PATENT DOCUMENTS

| CN | 113153442 A | 7/2021 | | |
| EP | 1106781 A1 * | 6/2001 | ............. | F01D 5/189 |

(Continued)

OTHER PUBLICATIONS

Extended European Search Report from EP Application No. 21150440.2 dated Jul. 6, 2021 (8 pages).

*Primary Examiner* — Michael Lebentritt
*Assistant Examiner* — Brian Christopher Delrue
(74) *Attorney, Agent, or Firm* — James Pemrick; Hoffman Warnick LLC

(57) ABSTRACT

A turbine rotor blade is additively manufactured and includes an airfoil body with a radially extending chamber for receiving a coolant flow, a tip end at a radial outer end of the airfoil body, and a shank at a radial inner end of the airfoil body. The radially extending chamber extends at least partially into the shank to define a shank inner surface. An integral impingement cooling structure is within the radially extending chamber. The integral impingement cooling structure allows an exterior surface of a hollow body thereof to be uniformly spaced from the airfoil inner surface despite the curvature of the chamber. The turbine rotor blade has impingement cooling throughout the blade.

20 Claims, 18 Drawing Sheets

(56) References Cited

U.S. PATENT DOCUMENTS

| | | | |
|---|---|---|---|
| 5,816,777 A | 10/1998 | Hall | |
| 5,934,874 A | 8/1999 | Hall et al. | |
| 6,283,708 B1 * | 9/2001 | Zelesky | F01D 5/189 416/97 R |
| 6,325,593 B1 * | 12/2001 | Darkins, Jr | F01D 5/189 415/115 |
| 7,837,441 B2 | 11/2010 | Spangler et al. | |
| 8,057,183 B1 | 11/2011 | Liang | |
| 8,905,714 B2 | 12/2014 | Ellis et al. | |
| 9,249,673 B2 | 2/2016 | Ellis et al. | |
| 9,322,279 B2 * | 4/2016 | Spangler | F01D 9/065 |
| 9,528,377 B2 | 12/2016 | Fedor et al. | |
| 9,810,070 B2 | 11/2017 | Johns et al. | |
| 10,550,701 B2 * | 2/2020 | Kiener | F01D 5/187 |
| 2002/0037217 A1 * | 3/2002 | Itzel | F01D 5/18 415/115 |
| 2002/0062945 A1 | 5/2002 | Hocker et al. | |
| 2013/0104567 A1 | 5/2013 | Konitzer et al. | |
| 2016/0222796 A1 * | 8/2016 | Spangler | F01D 5/187 |
| 2016/0281525 A1 | 9/2016 | Nguyen et al. | |
| 2018/0023398 A1 * | 1/2018 | Jones | F01D 5/145 416/95 |
| 2021/0140321 A1 * | 5/2021 | Lee | B22C 9/10 |
| 2021/0222566 A1 * | 7/2021 | Snider | F01D 5/186 |

FOREIGN PATENT DOCUMENTS

| | | | |
|---|---|---|---|
| EP | 1126135 A2 * | 8/2001 | F01D 5/187 |
| EP | 3854991 A2 | 7/2021 | |
| JP | H0953406 A | 2/1997 | |
| WO | 2019037931 A1 | 2/2019 | |

\* cited by examiner

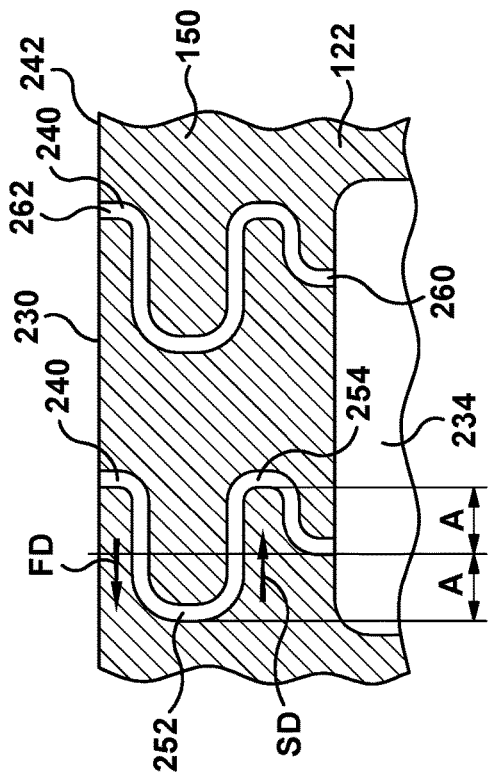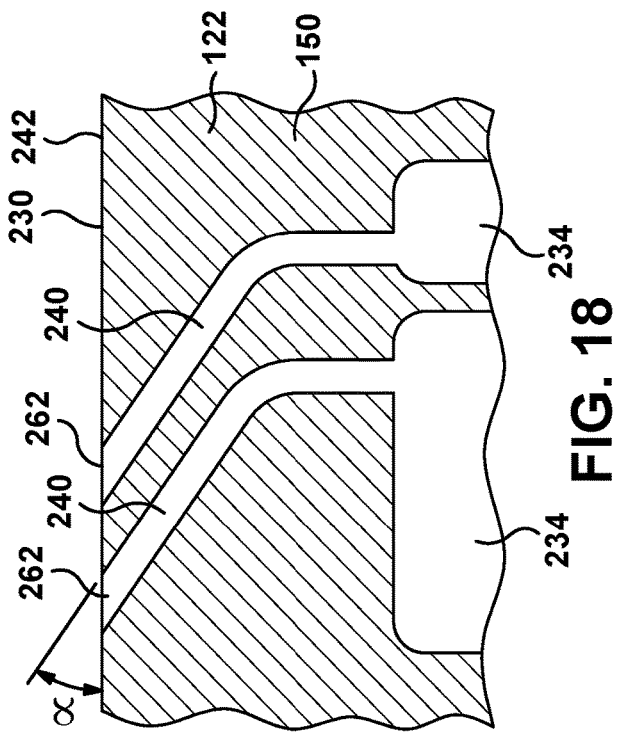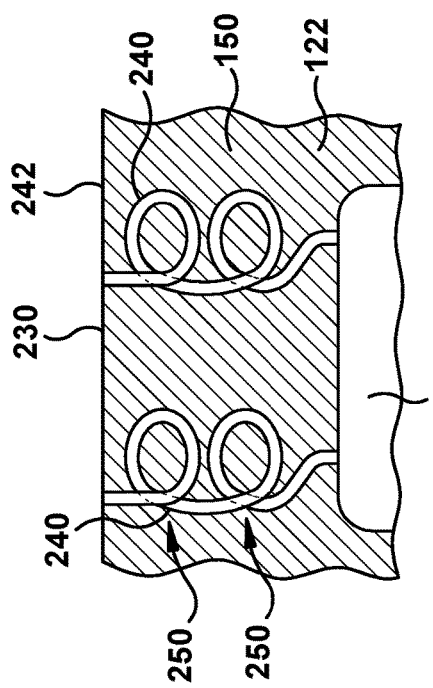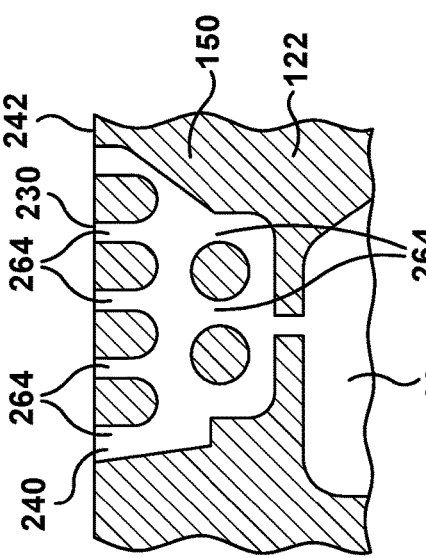

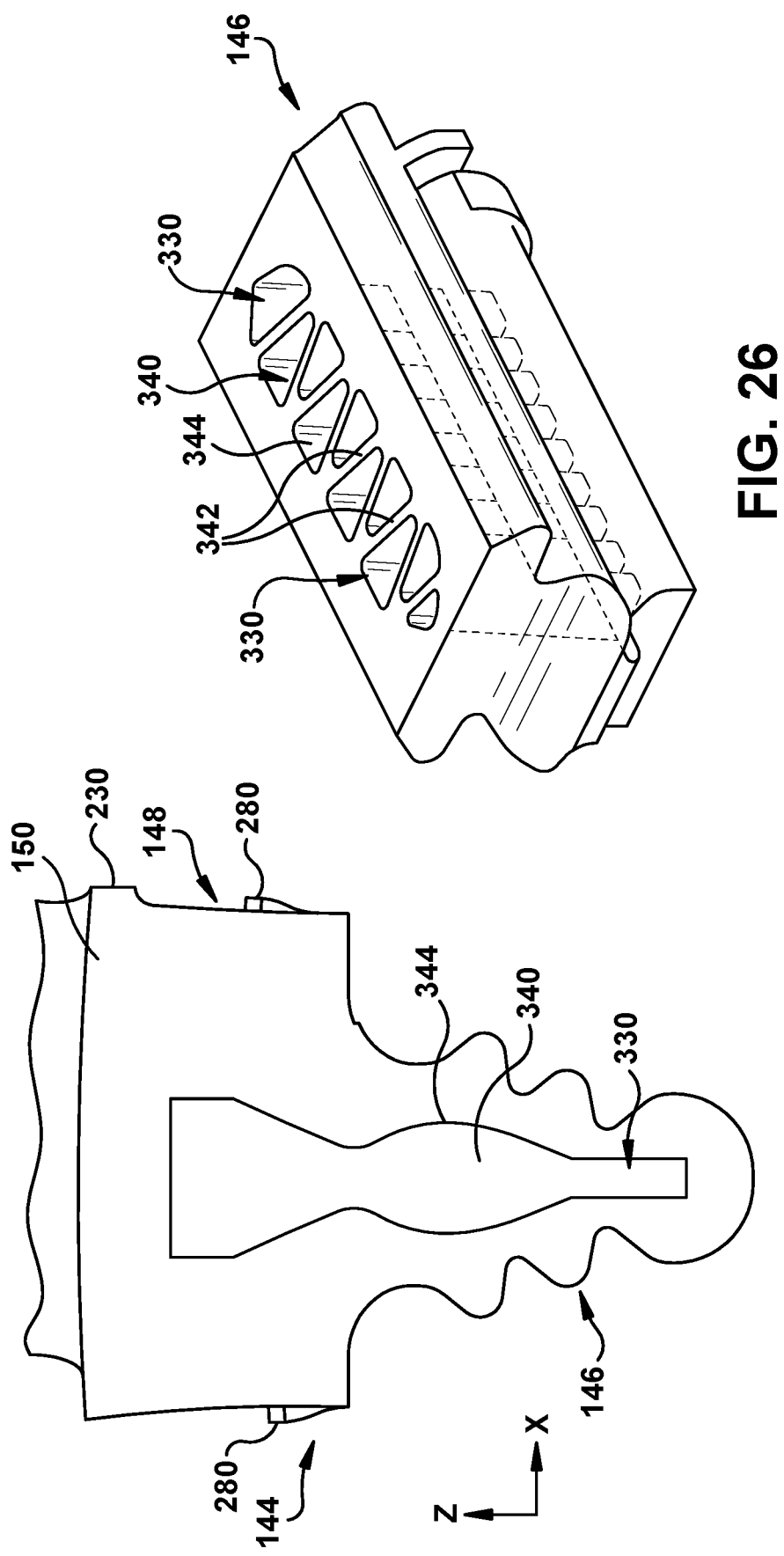

TURBINE ROTOR BLADE WITH INTEGRAL IMPINGEMENT SLEEVE BY ADDITIVE MANUFACTURE

BACKGROUND

The disclosure relates generally to turbomachines, and more particularly, to a turbine rotor blade with a number of additively manufactured, integral features such as an integral impingement sleeve, non-linear cooling passages in a platform, angel wings with a coolant transfer passage, and a hollow dovetail with an integral lattice support structure.

Turbomachines include a plurality of turbine rotor blades coupled to a rotor. A working fluid such as steam or a combusted fuel is forced against the blades to force them to turn the rotor. Turbine rotor blades operate in extremely hot conditions and require cooling. Cooling features can be provided in a number of ways.

One mechanism to provide cooling is an impingement insert. An impingement insert or sleeve includes a hollow body having cooling passages in a wall thereof that allow delivery of a coolant through the cooling passages to impact or impinge on a surface to be cooled. Impingement inserts are used, for example, in a variety of hot gas path (HGP) components in turbomachinery such as a turbine rotor blade to increase cooling performance of cooling circuitry therein. One challenge with impingement inserts is positioning the impingement insert within a tapered or curved cavity in an HGP component in a sufficiently close manner to allow for high cooling performance, but not so close that cooling is ineffective. One indicator of cooling performance of an impingement insert is the Z/D parameter, which is a ratio of a standoff distance Z between the insert and interior surface of the HGP component and a diameter D of the cooling passages (holes) in the impingement insert. The Z/D parameter value of an insert is typically designed to be within a desired range that results in better cooling performance.

Impingement cooling is typically not provided by an insert where the necessary standoff distance cannot be created. For example, where the cavity in the HGP component curves too significantly that an impingement insert cannot be made sufficiently thin or curved to respect the necessary standoff distance, impingement cooling cannot be provided. One approach to address this challenge provides the impingement insert in a number of flexible, longitudinal sections to make it easier to insert them into the HGP component. However, having to sequentially position and couple a number of insert sections together or couple them to the HGP component, increases the complexity, time and costs of manufacture. Flexible impingement insert sections also do not provide a contiguous element about their periphery, i.e., laterally (cross-section), which can detract from cooling performance where they are discontinuous.

Impingement cooling has been applied in a limited manner to rotating turbine rotor blades in turbomachines, e.g., for leading edges thereof. However, impingement cooling has not been applied more broadly across an entirety of an inner surface of a turbine rotor blades because the centrifugal forces experienced by the rotating blades forces the coolant to the radially outer tip end of the blade as it rotates, making impingement cooling less effective.

Another cooling feature includes cooling passages through a part of the turbine rotor blade to be cooled. For example, the turbine rotor blades include a platform that extends laterally to form part of a working fluid path through the turbomachine in cooperation with a platform of an adjacent turbine rotor blade. Due to the high temperatures of the working fluid, the platforms typically include a cooling circuit therein that feeds a number of cooling passages that exit through a slash face of the platform. Some platforms include a damping pin seat in the slash face that receives an axially extending pin therein that mates with an adjacent damping pin seat in an adjacent platform to seal the working fluid path. The cooling passages are typically drilled into the slash face to fluidly couple the passages to the cooling circuit. Consequently, the cooling passages have a linear configuration that may not adequately cool all of the platform. For example, the cooling passages may pass through an extension that forms a damping pin seat, but inadequately cool other portions of the slash face.

Cooling features may also be employed with angel wings. In this regard, another cooling feature includes cooling passages that either deliver coolant into the angel wing, or radially around an angel wing. Mounts for turbine rotor blades may also include cooling features therein.

BRIEF DESCRIPTION

A first aspect of the disclosure provides a turbine rotor blade, comprising: an airfoil body including a concave pressure side outer wall and a convex suction side outer wall that connect along leading and trailing edges, the outer walls having an airfoil inner surface defining a radially extending chamber for receiving a coolant flow; a tip end at a radial outer end of the airfoil body; a shank at a radial inner end of the airfoil body, the radially extending chamber extending at least partially into the shank to define a shank inner surface; and an impingement cooling structure within the radially extending chamber, the impingement cooling structure including: a hollow body including a first end, a second end, an interior surface and an exterior surface, a plurality of cooling passages through the hollow body and in fluid communication with the radially extending chamber to allow the coolant flow to pass from the interior surface of the hollow body to impinge on at least the airfoil inner surface, wherein the first end of the hollow body is integrally formed to the shank inner surface, and wherein the exterior surface of the hollow body is uniformly spaced from the airfoil inner surface between the first end and the second end of the hollow body.

A second aspect of the disclosure provides an additively manufactured turbine rotor blade, comprising: an airfoil body including a concave pressure side outer wall and a convex suction side outer wall that connect along leading and trailing edges, the outer walls having an airfoil inner surface defining a radially extending chamber for receiving a coolant flow; and an integral impingement cooling structure within the radially extending chamber, the integral impingement cooling structure including: a hollow body including a first end, a second end, an interior surface and an exterior surface, and a plurality of cooling passages through the hollow body and in fluid communication with the radially extending chamber to allow the coolant flow to pass from the interior surface of the hollow body to impinge on at least the airfoil inner surface, wherein the exterior surface of the hollow body is uniformly spaced from the airfoil inner surface between the first end and the second end of the hollow body.

A third aspect of the disclosure provides a method comprising: sequentially creating a layer of material and applying a heat source to sinter the layer of materials to form: an airfoil body including a concave pressure side outer wall and a convex suction side outer wall that connect along leading and trailing edges, the outer walls having an airfoil inner surface defining a radially extending chamber for receiving a coolant flow; and an impingement cooling structure within the radially extending chamber, the integral impingement cooling structure including: a hollow body including a first end, a second end, an interior surface and an exterior surface, and a plurality of cooling passages through the hollow body and in fluid communication with the radially extending chamber to allow the coolant flow to pass from the interior surface of the hollow body to impinge on at least the airfoil inner surface, wherein the exterior surface of the hollow body is uniformly spaced from the airfoil inner surface between the first end and the second end of the hollow body.

A fourth aspect of the disclosure provides a turbine rotor blade, comprising: an airfoil body including a concave pressure side outer wall and a convex suction side outer wall that connect along leading and trailing edges, the outer walls defining a radially extending chamber for receiving a coolant flow; a platform extending laterally outward relative to the airfoil body and terminating at at least one slash face; a cooling circuit defined within the platform and in fluid communication with a source of the coolant flow; and at least one cooling passage defined in the platform and in fluid communication with the cooling circuit, the at least one cooling passage extending in a non-linear configuration from the cooling circuit to exit through the at least one slash face of the platform.

A fifth aspect of the disclosure provides an additively manufactured turbine rotor blade, comprising: an airfoil body including a concave pressure side outer wall and a convex suction side outer wall that connect along leading and trailing edges, the outer walls defining a radially extending chamber for receiving a coolant flow; a platform extending laterally outward relative to the airfoil body and terminating at least one slash face; a cooling circuit defined within the platform and in fluid communication with a source of the coolant flow; and at least one cooling passage defined in the platform and in fluid communication with the cooling circuit, the at least one cooling passage extending in a non-linear configuration from the cooling circuit to exit through the slash face of the platform.

A sixth aspect includes a turbine rotor blade, comprising: an airfoil body including a concave pressure side outer wall and a convex suction side outer wall that connect along leading and trailing edges; a shank at a radial inner end of the airfoil body; at least one angel wing extending laterally from at least one side of the shank; and a coolant transfer passage defined through the at least one angel wing, the coolant transfer passage fluidly coupling a first wheel space portion defined between the shank and a first adjacent shank of a first adjacent turbine rotor blade and a second wheel space portion defined between the shank and a second adjacent shank of a second adjacent turbine rotor blade.

A seventh aspect of the disclosure relates to an additively manufactured turbine rotor blade, comprising: an airfoil body including a concave pressure side outer wall and a convex suction side outer wall that connect along leading and trailing edges; a shank at a radial inner end of the airfoil body; at least one angel wing extending laterally from at least one side of the shank; and a coolant transfer passage defined through the at least one angel wing, the coolant transfer passage fluidly coupling a first wheel space portion defined between the shank and a first adjacent shank of a first adjacent turbine rotor blade and a second wheel space portion defined between the shank and a second adjacent shank of a second adjacent turbine rotor blade.

An eighth aspect relates to a set of turbine rotor blades, comprising: a first turbine rotor blade, a second turbine rotor blade and a third turbine rotor blade, the first turbine rotor blade positioned between the second and third turbine rotor blades, each turbine rotor blade including: an airfoil body including a concave pressure side outer wall and a convex suction side outer wall that connect along leading and trailing edges, a shank at a radial inner end of the airfoil body, at least one angel wing extending laterally from at least one side of the shank, and wherein the shanks of the first and second turbine rotor blades define a first wheel space portion therebetween and the shanks of the first and third turbine rotor blades define a second wheel space portion therebetween; and a coolant transfer passage defined through the at least one angel wing in the first turbine rotor blade, the coolant transfer passage fluidly coupling the first wheel space portion and the second wheel space portion.

A ninth aspect relates to a turbine rotor blade root, comprising: a shank having a radially extending chamber defined therein; a blade mount at a radial inner end of the shank, the blade mount having a hollow interior defined therein, the hollow interior in fluid communication with the radially extending chamber; and a lattice support structure disposed within the hollow interior of the blade mount.

A tenth aspect includes a turbine rotor blade root, comprising: a shank having a radially extending chamber defined therein; a blade mount at a radial inner end of the shank, the blade mount having a hollow interior defined therein, the hollow interior in fluid communication with the radially extending chamber; a lattice support structure disposed within the hollow interior of the blade mount; at least one angel wing extending laterally from at least one side of the shank; and a coolant transfer passage defined through the at least one angel wing, the coolant transfer passage fluidly coupling a first wheel space portion defined between the shank and a first adjacent shank of a first adjacent turbine rotor blade root and a second wheel space portion defined between the shank and a second adjacent shank of a second adjacent turbine rotor blade root.

An eleventh aspect relates to a turbine rotor blade root, comprising: a shank having a radially extending chamber defined therein; a blade mount at a radial inner end of the shank, the blade mount having a hollow interior defined therein, the hollow interior in fluid communication with the radially extending chamber; a lattice support structure disposed within the hollow interior of the blade mount; at least one angel wing extending laterally from at least one side of the shank; and a coolant transfer passage defined through the at least one angel wing, the coolant transfer passage fluidly coupling a first wheel space portion defined between the shank and a first adjacent shank of a first adjacent turbine rotor blade root and a second wheel space portion defined between the shank and a second adjacent shank of a second adjacent turbine rotor blade root.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 15 shows an enlarged cross-sectional view of a cooling passage in a platform of a turbine rotor blade, according to embodiments of the disclosure.

FIG. 16 shows an enlarged cross-sectional view of a cooling passage in a platform of a turbine rotor blade, according to embodiments of the disclosure.

FIG. 17 shows an enlarged cross-sectional view of a cooling passage in a platform of a turbine rotor blade, according to embodiments of the disclosure.

FIG. 18 shows an enlarged cross-sectional view of a cooling passage in a platform of a turbine rotor blade, according to embodiments of the disclosure.

FIG. 25 shows a cross-sectional view of a hollow blade mount of a turbine rotor blade including a lattice support structure, according to embodiments of the disclosure.

FIG. 26 shows a perspective, cross-sectional view of a root of a turbine rotor blade including a lattice support structure, according to embodiments of the disclosure It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1:
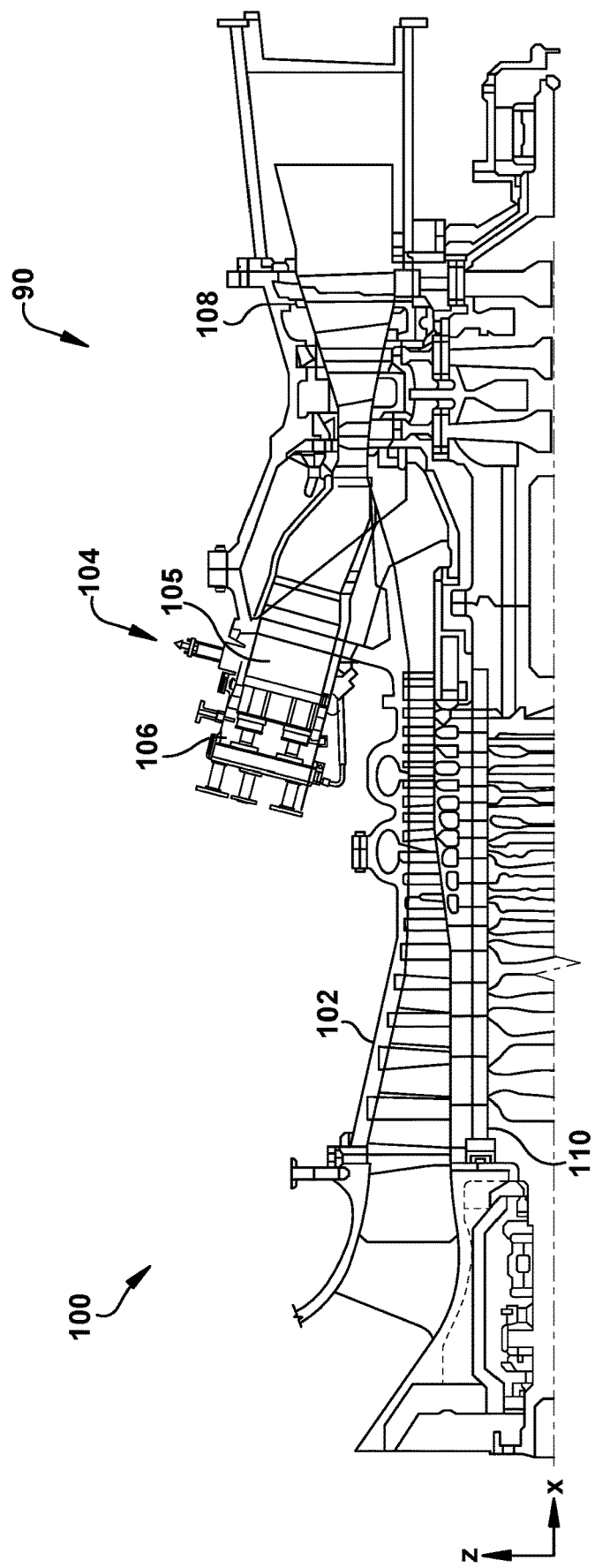
FIG. 1 shows a schematic view of an illustrative gas turbine (GT) system.

As an initial matter, in order to clearly describe the current disclosure it will become necessary to select certain terminology when referring to and describing relevant machine components within, for example, a turbomachine. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbomachine or, for example, the flow of air through the combustor or coolant through one of the turbine's components. The term "downstream" corresponds to the direction of flow of the fluid, and the term "upstream" refers to the direction opposite to the flow. The terms "forward" and "aft," without any further specificity, refer to directions, with "forward" referring to the front end of the turbomachine (i.e., compressor end) or a component thereof, and "aft" referring to the rearward end of the turbomachine (i.e., turbine end) or component thereof. Forward and aft generally denoted by an X direction in the drawings. It is often required to describe parts that are at differing radial positions with regard to a center axis. The term "radial" refers to movement or position perpendicular to an axis, e.g., a turbomachine rotor axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. Radial direction is generally denoted by a Z direction in the drawings. The term "axial" refers to movement or position parallel to an axis, i.e., a turbomachine rotor axis. Finally, the term "circumferential" refers to movement or position around an axis. Although not shown as curved in the legends in the drawings, the circumferential direction is generally denoted by a Y direction in the drawings. It will be appreciated that such terms may be applied in relation to the rotor axis of a turbomachine.

In addition, several descriptive terms may be used regularly herein, as described below. The terms "first", "second", and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Where an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "integral," "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

As indicated above, the disclosure provides a turbine rotor blade or turbine rotor blade root including a number of integral features which are made possible through additive manufacturing of the blade and/or root. The additive manufacturing allows formation of structures that provide cooling where not previously allowed, improve cooling compared to conventional systems, provide additional structural strength and/or lower the weight of the blade.

A. Introduction

FIG. 1 shows a schematic view of an illustrative turbomachine 90 that may include a turbine rotor blade including integral features according to various embodiments of the disclosure. In the example shown, turbomachine 90 includes a gas turbine (GT) system 100 that includes a compressor 102 and a combustor 104. Combustor 104 includes a combustion region 105 and a fuel nozzle assembly 106. GT system 100 also includes a turbine 108 and a common compressor/turbine shaft (sometimes referred to as a rotor) 110. In one embodiment, GT system 100 is a 7HA or 9HA GT system, commercially available from General Electric Company, Greenville, S.C. The present disclosure is not limited to any one particular GT system and may be employed in connection with other engines including, for example, the other HA, F, B, LM, GT, TM and E-class engine models of General Electric Company, and engine models of other companies. Further, a turbine rotor blade, as described herein, may find application in other forms of turbomachines, e.g., steam turbines, jet engines, compressors, etc.

In operation, air flows through compressor 102 and compressed air is supplied to combustor 104. Specifically, the compressed air is supplied to fuel nozzle assembly 106 that is integral to combustor 104. Assembly 106 is in flow communication with combustion region 105. Fuel nozzle assembly 106 is also in flow communication with a fuel source (not shown in FIG. 1) and channels fuel and air to combustion region 105. Combustor 104 ignites and combusts fuel. Combustor 104 is in flow communication with turbine 108 for which gas stream thermal energy is converted to mechanical rotational energy. Turbine 108 is rotatably coupled to and drives rotor 110. Compressor 102 also is rotatably coupled to rotor 110. In the illustrative embodiment, there is a plurality of combustors 104 and fuel nozzle assemblies 106.

Figure 2:
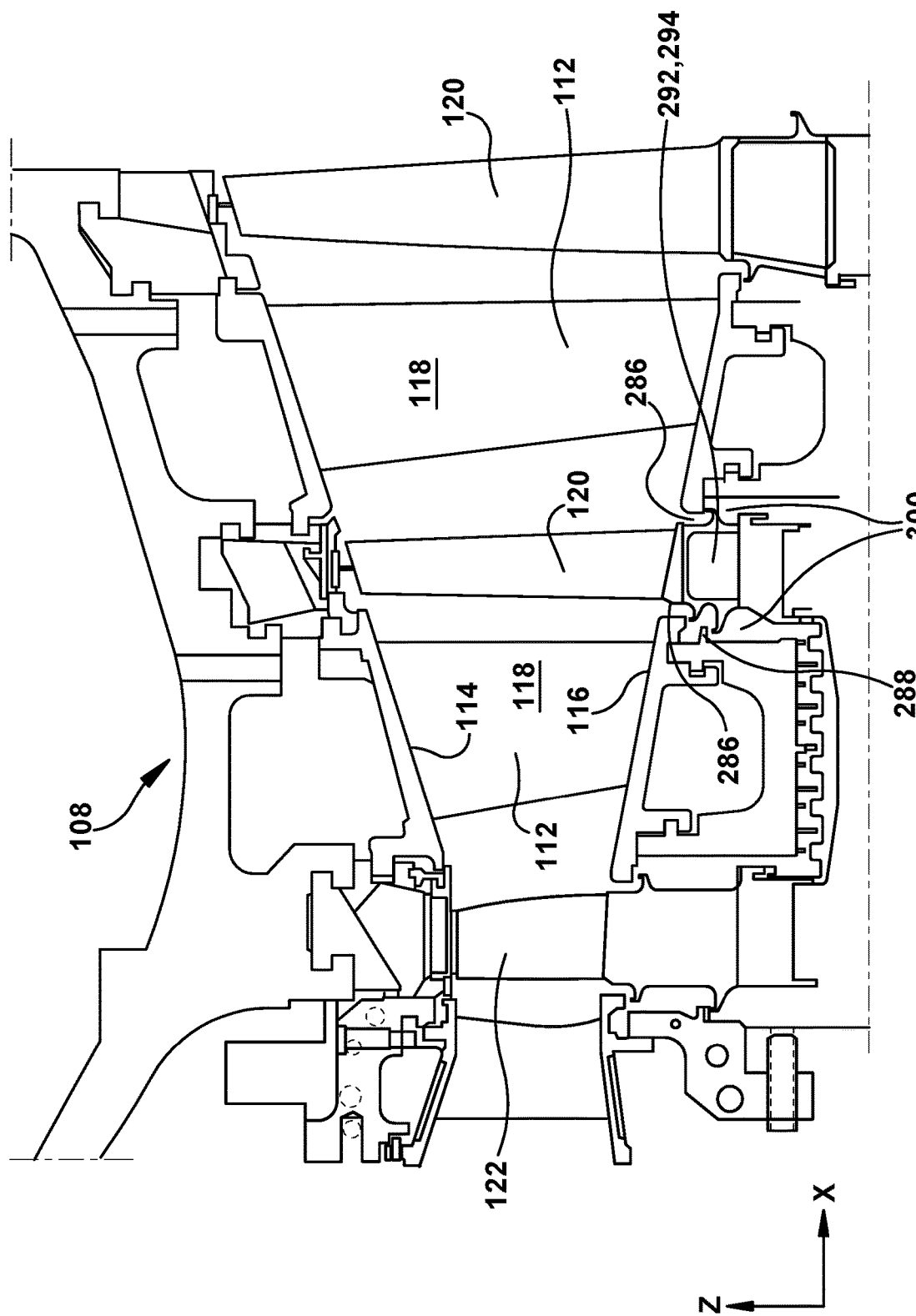
FIG. 2 shows a cross-sectional view of an illustrative gas turbine assembly that may be used with the GT system in FIG. 1.
Figure 4:
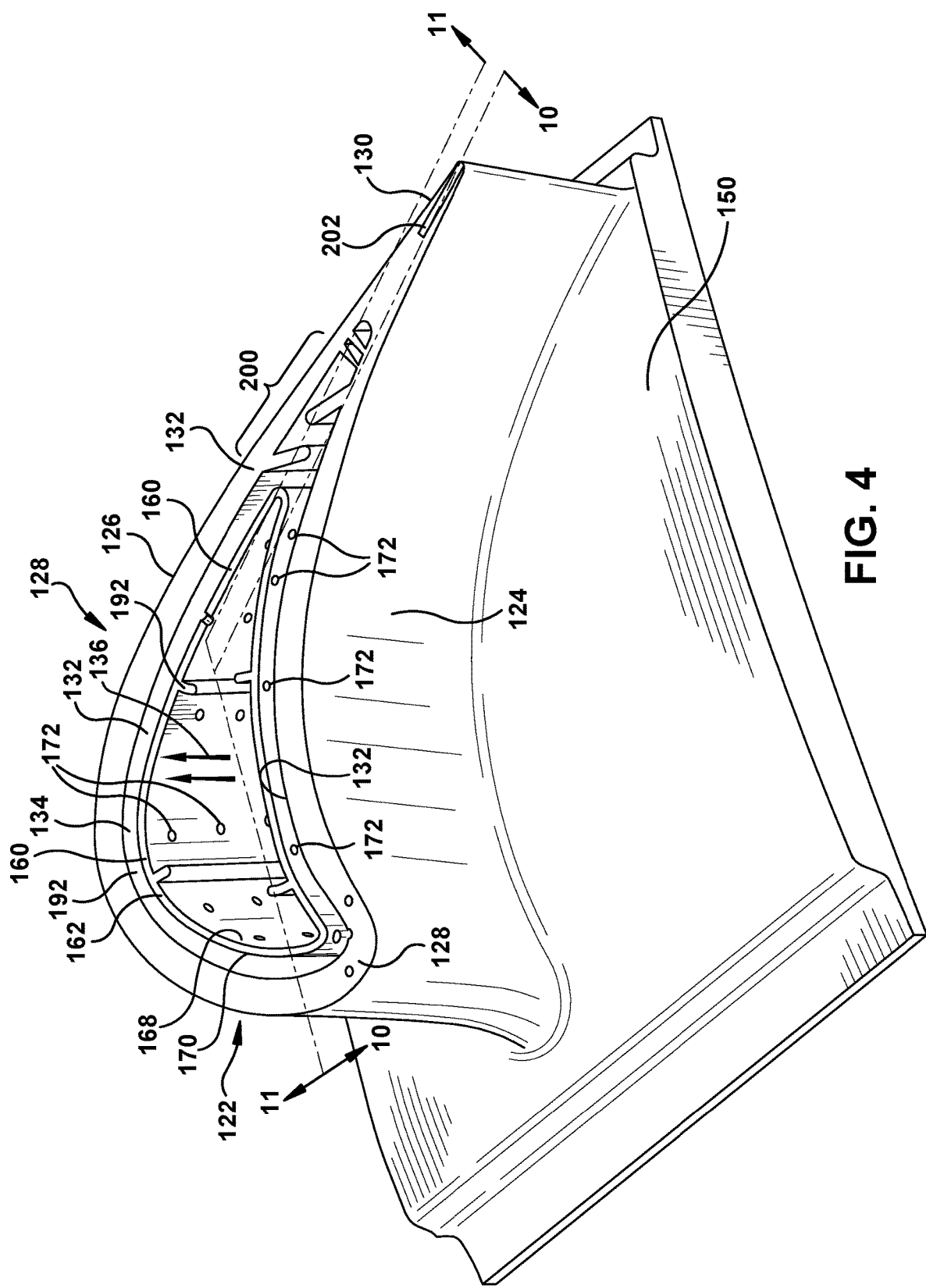
FIG. 4 shows an axial cross-sectional view of a turbine rotor blade including an integral impingement sleeve, according to one embodiment of the disclosure.

FIG. 2 shows a cross-sectional view of an illustrative turbine 108 with three stages that may be used with GT system 100 in FIG. 1. Each stage includes sets of stationary vanes or nozzles 112 and turbine rotor blades 120. Stationary nozzles 112 may be held in turbine 108 by a radially outer platform 114 and a radially inner platform 116. Stationary nozzles 112 may include one or more circumferentially spaced airfoils 118 (FIG. 4). Turbine rotor blades 120 are coupled to rotor 110 and extend between rows of stationary nozzles 112. Combustion gases are directed by stationary nozzles 112 against turbine rotor blades 120 to turn rotor 110 (FIG. 1).

Figure 3:
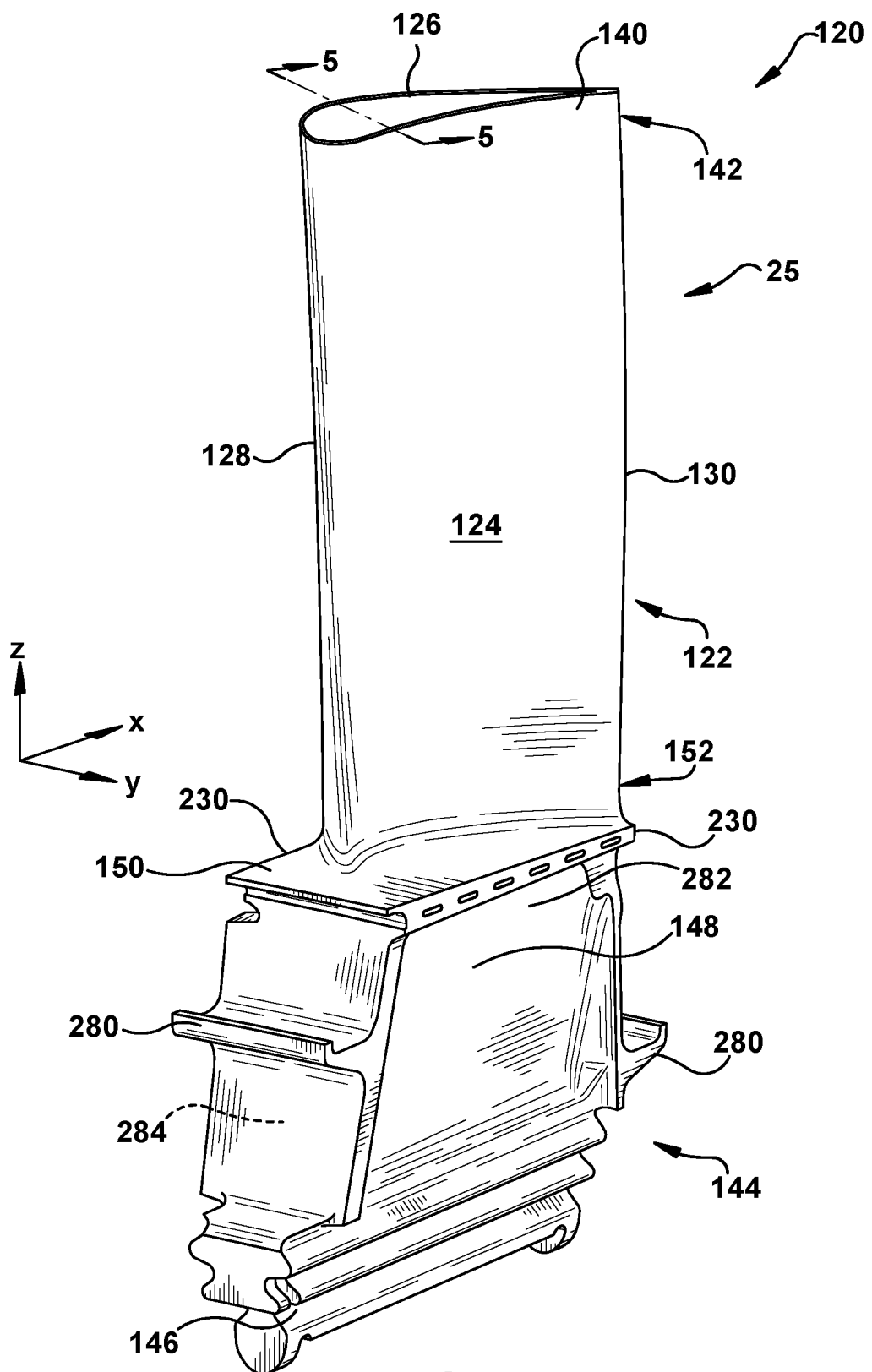
FIG. 3 shows a perspective view of a turbine rotor blade of the type in which embodiments of the present disclosure may be employed.
Figure 5:
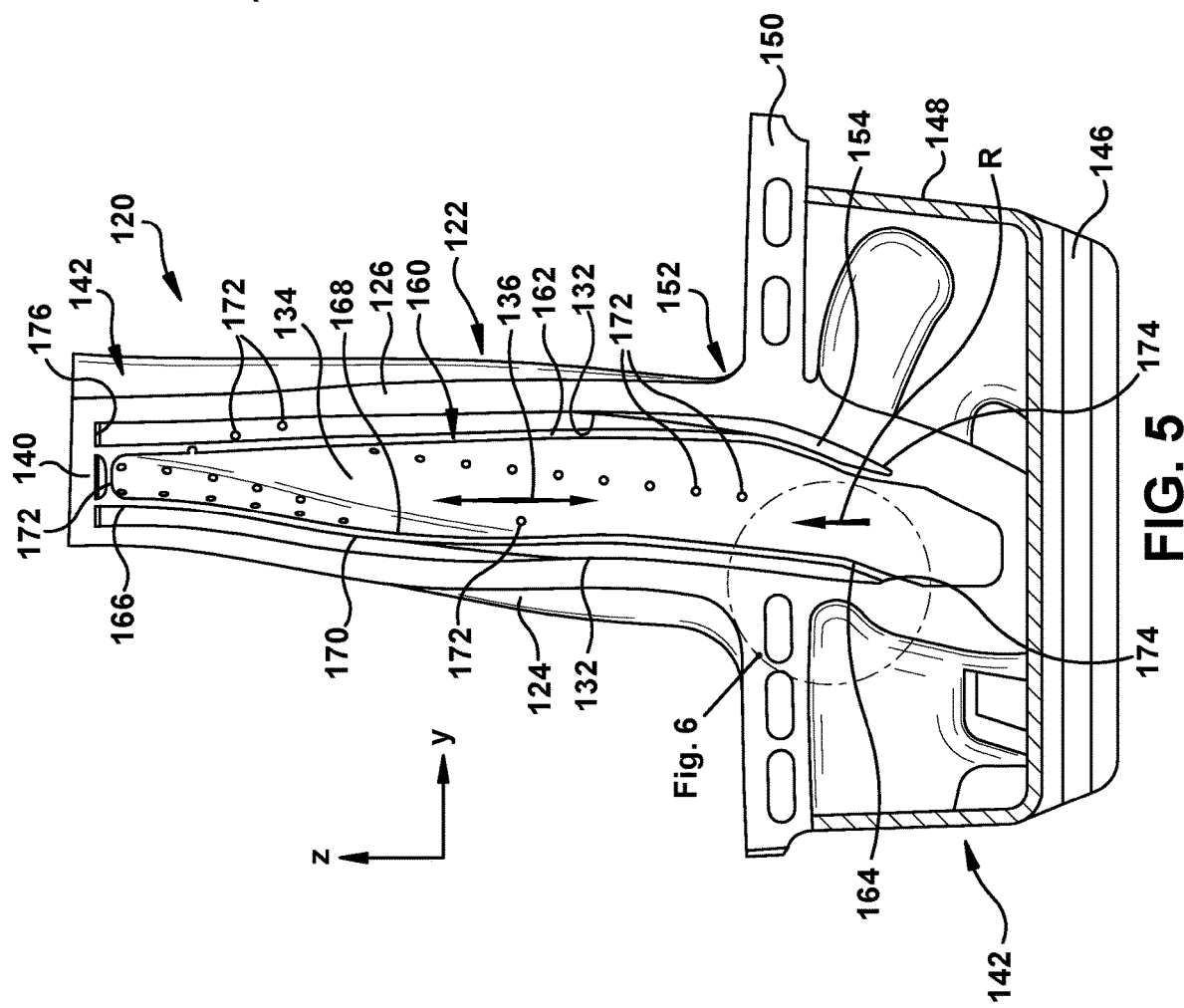
FIG. 5 shows a radial, circumferential cross-sectional view of a turbine rotor blade including an integral impingement sleeve, according to one embodiment of the disclosure.
Figure 21:
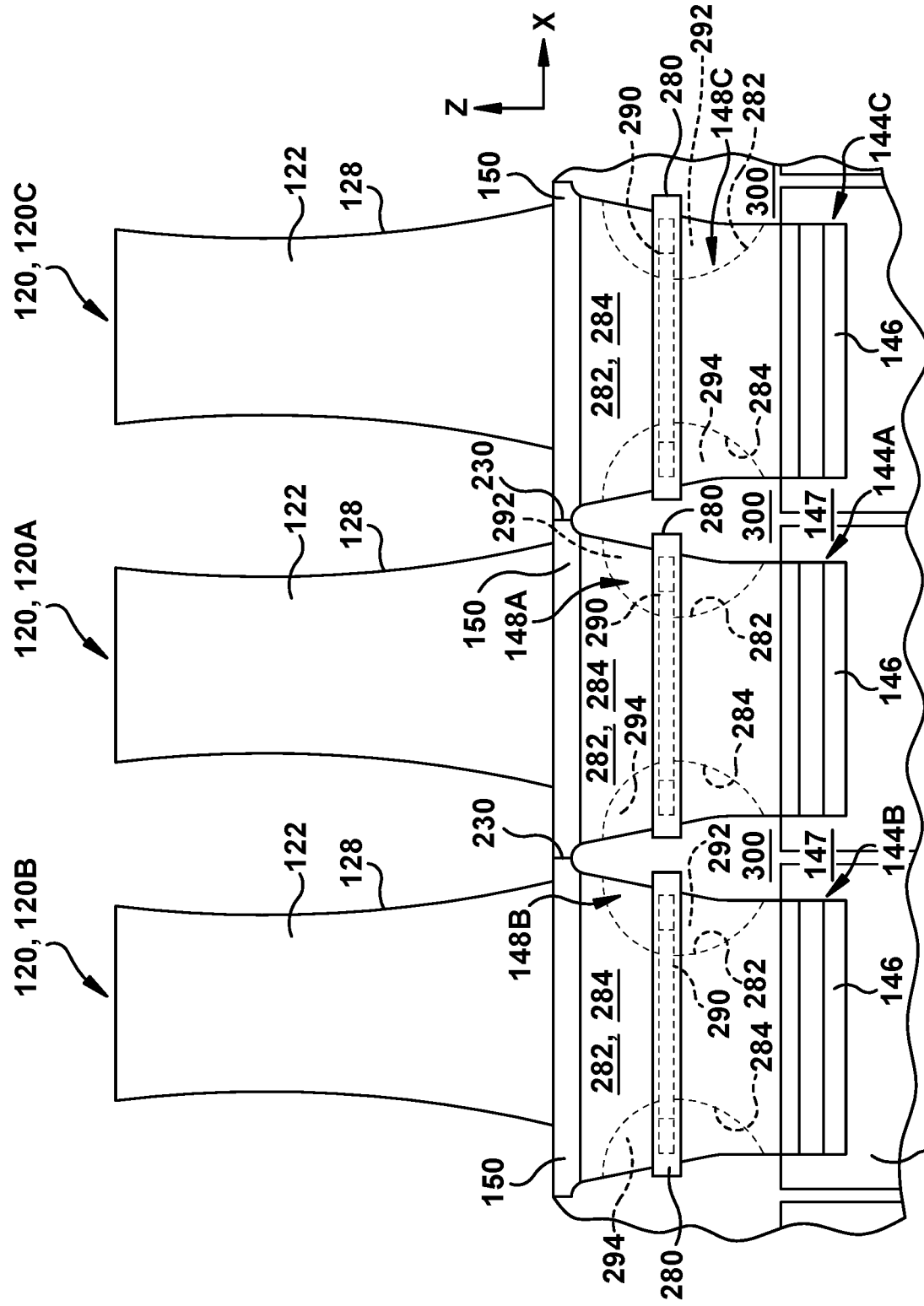
FIG. 21 shows a schematic axial view of a set of turbine rotor blades including an angel wing, according to embodiments of the disclosure.

FIG. 3 shows a perspective view of an illustrative turbine rotor blade 120 of GT system 100 in which integral features according to various embodiments of the disclosure may be employed. FIG. 4 shows an axial cross-sectional view of turbine rotor blade 120 including an integral feature in the form of an integral impingement cooling structure 160 according to various embodiments of the disclosure. Turbine rotor blade 120 includes an airfoil body 122 including a concave pressure side outer wall 124 and a convex suction side outer wall 126 that connect along leading and trailing edges 128, 130. As shown in FIG. 4, outer walls 124, 126 have an airfoil inner surface 132 defining a radially extending chamber 134 for receiving a coolant flow 136. Referring again to FIG. 3, turbine rotor blade 120 may also include a tip end 140 at a radial outer end 142 of airfoil body 122. Turbine rotor blade 120 may also include a turbine rotor blade root 144 (hereinafter "root 144") by which turbine rotor blade 120 attaches to rotor 110 (FIG. 1), e.g., by a rotor wheel 147 (FIG. 21). For purposes of this disclosure, root 144 may include any portion of turbine rotor blade 120 including, and radially inward of, platform 150. Root 144 may include a blade mount 146 configured for mounting in a corresponding slot in the perimeter of a rotor wheel 147 (FIG. 21). Blade mount 146 may have any now known or later developed outer configuration for mounting to rotor disk 147 (FIG. 21) such as but not limited to a dovetail or fir tree arrangement. Turbine rotor blade 120, i.e., root 144 thereof, may further include a shank 148 that extends between blade mount 146 and a platform 150. Platform 150 is disposed at the junction of airfoil body 122 and shank 148 and defines a portion of the inboard boundary of the flow path through turbine 108 (FIGS. 1-2). Shank 148 is thus located at a radial inner end 152 of airfoil body 122, and blade mount 146 is located radially inward of shank 148. Platform 150 extends laterally outward relative to shank 148. As will be described further herein, radially extending chamber 134 may extend at least partially into shank 148 to define a shank inner surface 154 (FIG. 5). Outer walls 124 and 126 of airfoil body 122 extend in the radial (Z) direction from platform 150 to tip end 140. It will be appreciated that airfoil body 122 is the active component of turbine rotor blade 120 that intercepts the flow of working fluid and induces the rotor to rotate.

B. Integral Impingement Cooling Structure

In certain embodiments, turbine rotor blade 120 may include, inter alia, airfoil body 122 and an integral feature in the form of an integral impingement cooling structure 160 therein. The impingement cooling structure is not an insert, but is made integrally through, e.g., additive manufacture, with the rest of the blade. As noted herein, airfoil body 122 may include concave pressure side outer wall 124 and convex suction side outer wall 126 that connect along leading and trailing edges 128, 130. The outer walls 124, 126 have airfoil inner surface 132 defining radially extending chamber 134 for receiving coolant flow 136. Turbine rotor blade 120 may also include tip end 140 at radial outer end 142 of airfoil body 122, and shank 148 at radial inner end 152 of airfoil body 122. Radially extending chamber 134 may extend at least partially into shank 148 to define shank inner surface 154. Integral impingement cooling structure 160 is within radially extending chamber 134, and may include hollow body 162 including a first end 164, a second end 166, an interior surface 168 and an exterior surface 170. A plurality of cooling passages 172 extend through hollow body 162 and are in fluid communication with the radially extending chamber 134 to allow the coolant flow to pass from interior surface 168 of hollow body 162 to impinge on the inner surface of at least airfoil body 122. In contrast to conventional impingement inserts, first end 164 of hollow body 162 is integrally formed to the shank inner surface 154, i.e., via the additive manufacturing. Consequently, exterior surface 170 of hollow body 162 may be made to be uniformly spaced from airfoil inner surface 132 between first end 164 and second end 166 of the hollow body 162, regardless of the curvature of the airfoil inner surface 132. In another embodiment, non-uniform, but custom-built, standoff spacing may be employed for purposes of providing different impingement cooling, heat pick-up and/or re-use. For example, closer standoff spacing may be employed where increased impingement cooling is required, and wider standoff spacing used where less impingement cooling is required. Further, the hollow body 162 may have cooling passages about an entirety of its periphery and radial span to provide impingement cooling throughout the blade, not just at a leading edge thereof. Hence, the integral impingement cooling structure allows for maximum coverage of impingement with limited sacrifices normally associated with impingement inserts, and can have a number of variable cooling features. For example, the turbine rotor blade may have: variable chordwise width for the impingement cooling structure or a pin bank aft thereof, tailored impingement cooling structure wall thickness for different cooling loads, and varied supports to address different coefficients of thermal expansion (CTE) between the airfoil body and impingement cooling structure.

As shown in FIG. 4, and the radial, circumferential cross-sectional view of FIG. 5, turbine rotor blade 120 may include impingement cooling structure 160 within radially extending chamber 134. Impingement cooling is typically provided by one or more impingement inserts that are inserted into a radially extending chamber 134 and coupled to airfoil body 122, e.g., by fasteners or welding. The impingement inserts are typically linear, but may include some curvature. Where radially extending chamber 134 has a curved airfoil inner surface 132 as in FIG. 5, it is impossible to have impingement inserts uniformly spaced from the inner surface along an entire radial span of the blade. In order to address this challenge, impingement cooling structure 160 according to embodiments of the disclosure is integrally formed with the rest of turbine rotor blade 120, via additive manufacturing.

As shown in FIG. 5, impingement cooling structure 160 includes hollow body 162 including first end 164, second end 166, interior surface 168 and exterior surface 170. Impingement cooling structure 160 also includes plurality of cooling passages 172 through hollow body 162 and in fluid communication with radially extending chamber 134 to allow coolant flow 136 to pass from interior surface 168 of the hollow body to impinge on at least airfoil inner surface 132, e.g., it may impinge inner surfaces in, inter alia, airfoil body 122, tip end 140, shank 148, and/or platform 150. In contrast to conventional turbine rotor blades, and as shown in FIG. 4 and especially FIG. 5, exterior surface 170 of hollow body 162 is uniformly spaced from airfoil inner surface 132 between first end 164 and second end 166 of hollow body 162. That is, using additive manufacturing rather than mechanical insertion, impingement cooling structure 160 can be formed (simultaneously with, e.g., airfoil inner surface 132) to have the same curvature, bends, twists and any other shape or dimension, to match that of the inner surface adjacent thereto. Notably, impingement cooling structure 160 can be uniformly spaced from airfoil inner surface 132 along an entire radial span that it covers, ensuring the desired Z/D parameter over all of turbine rotor blade 120. The Z/D parameter is a ratio of a standoff distance Z between exterior surface 170 and an inner surface (e.g., airfoil inner surface 132, shank inner surface 154, etc.) of turbine rotor blade 120 and a diameter D of cooling passages 172 (holes) in impingement cooling structure 160. In one example, Z/D ranges from approximately 1 to approximately 10. In another example, Z/D may range from approximately 2 to approximately 6. A standoff distance Z may be smaller than conventionally available for castings, e.g., less than approximately 1.27 millimeters (0.05 inches). Smaller diameter D cooling passages 172 than conventional castings may also be employed, e.g., as a function of clogging from debris. Advantageously, cooling passages 172 may extend around an entire peripheral extent of hollow body 162 such that coolant flow 136 exits hollow body 162 in all directions to provide impingement cooling to all of airfoil inner surface 132 of airfoil body 122. Alternatively, cooling passages 172 may be omitted in areas where impingement cooling of inner surfaces 132, 154 is not desired or required. Cooling passages 172 may extend along any desired radial extent of hollow body 162.

As shown in FIG. 5, first end 164 of hollow body 162 is integrally formed to shank inner surface 154. First end 164 meets shank inner surface 154 at a meeting location 174, which extends about the entire periphery of first end 164, i.e., there are no openings between first end 164 and shank inner surface 154 at meeting location (other than perhaps a cooling passage 172). In certain embodiments, first end 164 of hollow body 162 is integrally formed to shank inner surface 154 radially inward of platform 150. However, this particular meeting location 174 may not be necessary in all instances, e.g., in some cases, meeting location 174 may be radially outward of platform 150. As shown in FIG. 5, although not necessary in all cases, second end 166 of hollow body 162 may also be integrally formed to inner surface 176 of tip end 140. Cooling passages 172 may optionally provide impingement cooling of tip end 140, or pass coolant to tip end 140 for other forms of cooling.

Figure 6:
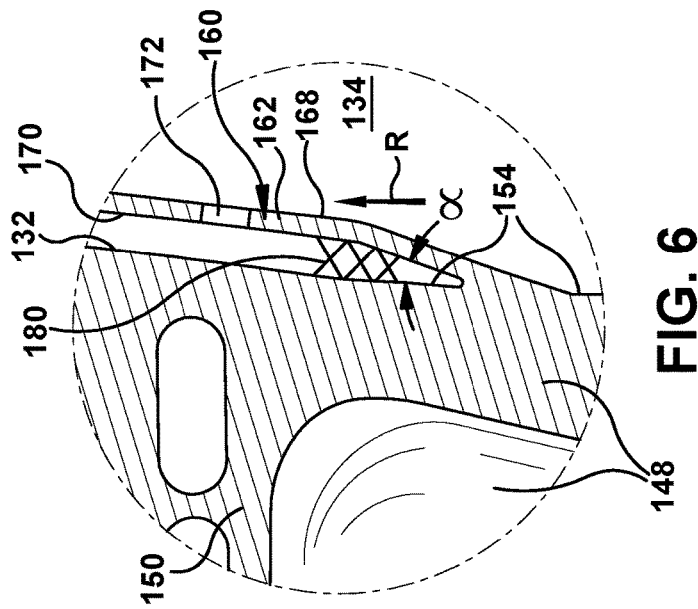
FIG. 6 shows an enlarged cross-sectional view of a meeting location of an impingement cooling structure and a shank of the turbine rotor blade, according to another embodiment of the disclosure.

FIG. 6 shows an enlarged cross-sectional view of meeting location 174 (FIG. 5) of impingement cooling structure 160 and shank 148 of turbine rotor blade 120, according to various embodiments of the disclosure. As shown in FIGS. 5 and 6, first end 164 of hollow body 162 may extend substantially in a radial direction (arrow Z) relative to meeting location 174 of first end 164 of hollow body 162 and shank inner surface 154. As used herein, "substantially in a radial direction" indicates that first end 164 extends radially away from rotor 110 (FIG. 1) with some degree of tolerance, e.g., +/−5°. In contrast, at least a portion of the shank inner surface 154 extends at an angle α relative to radial direction Z from meeting location 174 of first end 164 of hollow body 162 and shank 148 (FIG. 6). In another embodiment, shank inner surface 154 is aligned substantially in a radial direction and first end 164 of hollow body gradually curves or transitions towards meeting location 174 to keep angle α, for example, <30°. In a further embodiment, both shank inner surface 154 and first end 164 of hollow body 162 gradually curve or transition towards meeting location 174. Angle α may be any angle desired and within the range of additive manufacture, e.g., <45° from vertical. To maintain structural integrity, it is desirable that angle α be as small as possible, e.g., <10°, <20° or <30°. As shown only in FIG. 6, in certain embodiments, a support structure 180 may be positioned between first end 164 of hollow body 162 and shank inner surface 154, e.g., radially outward of meeting location 174 and radially inward of platform 150. In further embodiments, support structures 180 may be positioned at any location between exterior surface 170 of hollow body 162 and airfoil inner surface 132, shank inner surface 154, etc. In still further embodiments, at least portions of support structure 180 include hollow support elements (e.g., lattice) to enable cooling flow directly from chamber 134 to outer walls 124 and/or 126 (FIG. 4) of airfoil body 122. For example, it may be desirable to provide film cooling to certain areas of airfoil body 122, such as leading and/or trailing edges 128, 130, directly from radially extending chamber 134. Support structure 180 may include any now known or later developed element(s) capable of positioning first end 164 of hollow body 162 relative to shank inner surface 154. Support structure 180 may include, but is not limited to: a lattice structure, straight or arced bar(s), etc. Support structure 180 may also be integrally formed via additive manufacture.

Figure 7:
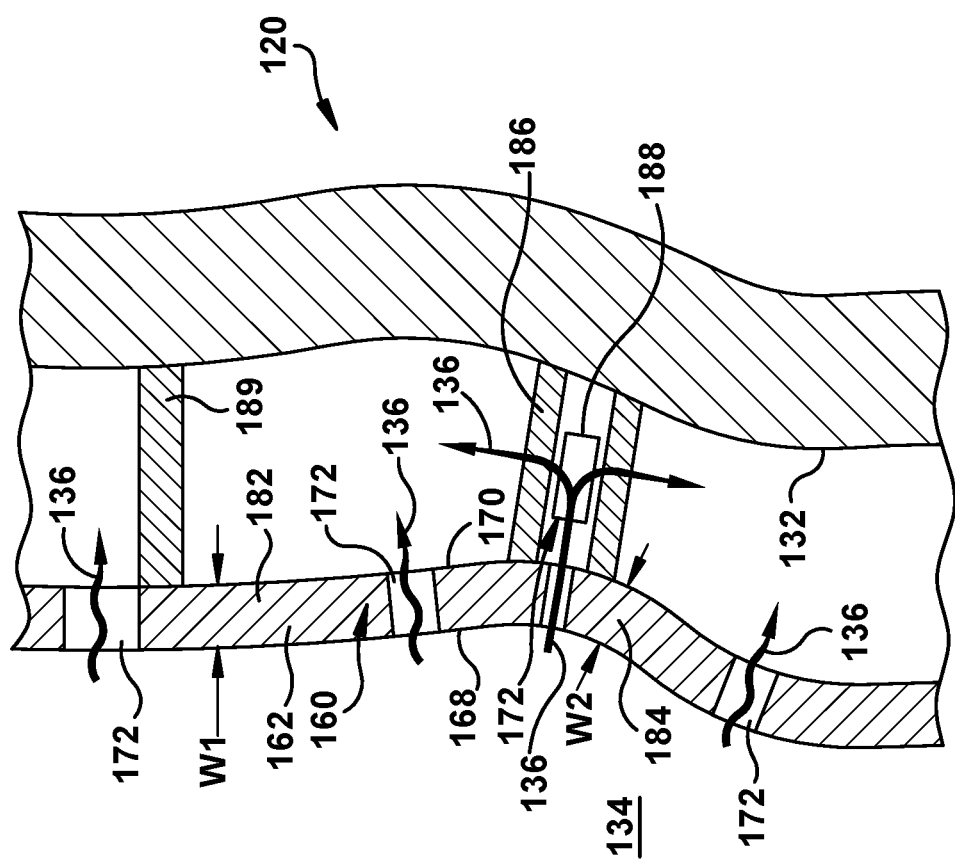
FIG. 7 shows an enlarged cross-sectional view of an impingement cooling structure with a variable wall thickness, according to another embodiment of the disclosure.

Impingement cooling structure 160 may also include a variety of optional alternative integral cooling features. In one example, impingement cooling structure 160 may be optionally formed with varying wall thicknesses. Varying wall thicknesses may be advantageous to, for example, accommodate varying CTEs between impingement cooling structure 160 and hotter airfoil body 122, shank 148 and/or platform 150. As observed in FIG. 5, airfoil body 122, shank 148 and/or platform 150 may have a wide variety of wall thicknesses, and may have varying thicknesses over an extent thereof. FIG. 7 shows an enlarged, partial cross-sectional view of a portion of impingement cooling structure 160 adjacent airfoil body 122, platform 150 or shank 148. As noted, in certain embodiments, as shown in FIG. 7, hollow body 162 may include at least one first portion 182 having a first wall thickness W1 between interior surface 168 and exterior surface 170 thereof, and at least one second portion 184 having a second wall thickness W2 between interior surface 168 and exterior surface 170 thereof. In the example shown, first wall thickness W1 is greater than second wall thickness W2. Any number of thicker and/or thinner portions 182, 184 may be provided in impingement cooling structure 160. The thickness of portions 182, 184 may be any dimension desired to address the structural and/or thermal requirements of the location.

In another example optional structure, additional support may be desired and/or required to support integral impingement cooling structure 160 relative to inner surfaces 132, 154. For example, additional support may be desired and/or required at thinner wall thickness portions 184 (FIG. 7) of impingement cooling structure 160. To this end, as shown in FIG. 7, turbine rotor blade 120 may also include a support 186 on exterior surface 170 of hollow body 162 in at least one portion 184 having thinner wall thickness W2. Support 186 may be integrally formed with hollow body 162 (and rest of turbine rotor blade 120) to space exterior surface 170 of hollow body 162 from, e.g., airfoil inner surface 132, between first end 164 (FIG. 5) and second end 166 of hollow body 162. Any number of supports 186 may be provided in thinner wall portion(s) 184. Support(s) 186 may include a passage(s) 188 therethrough in fluid communication with one of the plurality of cooling passages 172, i.e., to allow coolant flow 136 to pass therethrough and impinge inner surface(s) 132, 154. In certain embodiments, regardless of wall thickness, turbine rotor blade 120 may include a support(s) 189 on exterior surface 170 of hollow body 162. Support 189 may be integrally formed with hollow body 162 (and rest of turbine rotor blade 120) to space exterior surface 170 of hollow body 162 from, e.g., airfoil inner surface 132, between first end 164 (FIG. 5) and second end 166 of hollow body 162. Supports 186, 189 may take any form that allows: reduction of stress between hotter outer walls 124, 126 of airfoil body 122 and cooler impingement cooling structure 160, provide any necessary thermal expansion, provide structural support, and/or desired spacing of hollow body 162 from inner surface(s) 132, 154. Supports 186, 189 can have any desired dimension and/or shape such as but not limited to: tubes, bars, etc.

Figure 8:
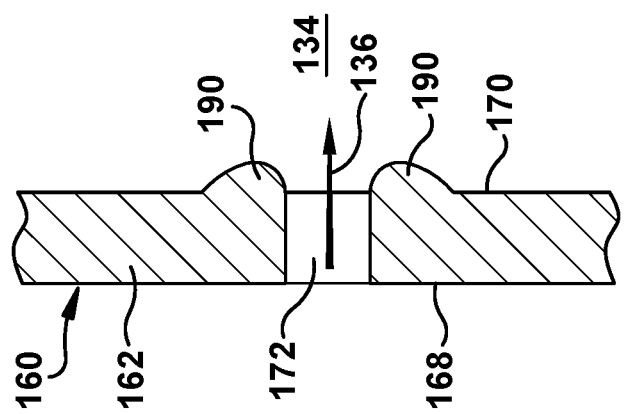
FIG. 8 shows an enlarged cross-sectional view of an impingement cooling structure with a reinforcement member about a cooling passage thereof, according to an embodiment of the disclosure.

FIG. 8 shows an enlarged cross-sectional view of another alternative embodiment including a reinforcement member 190 surrounding at least one of cooling passages 172. Reinforcement member 190 may include any structurally strengthening member such as a thicker wall, etc. Certain embodiments, as shown in FIG. 4, may also include a stiffener rib 192 integrally formed to interior surface 168 of hollow body 162. Any number of stiffener ribs 192 may be provided, and each may extend any desired radial extent of hollow body 162. Supports 186, 189, reinforcement member 190 and/or stiffener rib 192 may be integrally formed with the rest of turbine rotor blade 120 via additive manufacture.

Figure 9:
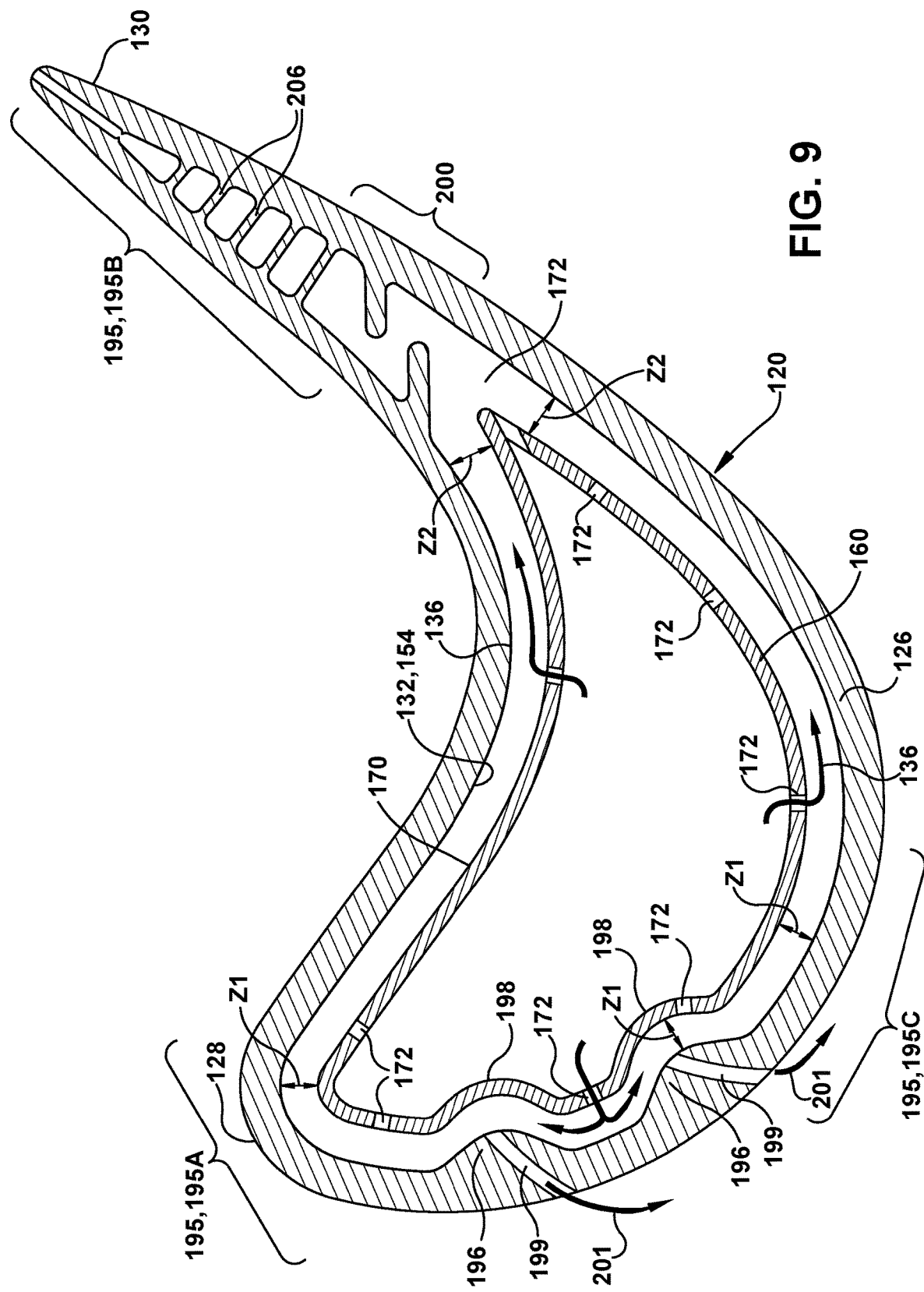
FIG. 9 shows a plan, cross-sectional view of an impingement cooling structure, according to alternative embodiments of the disclosure.

FIG. 9 shows a cross-sectional view of turbine rotor blade 120 including integral impingement cooling structure 160 and additional optional alternative integral cooling features. In one alternative embodiment, impingement cooling structure 160 may be optionally formed with varying spacing Z from inner surface 132, 154. The spacing Z may be customized to provide the desired Z/D parameter and desired cooling at various locations. For example, turbine rotor blade 120 may have a number of high heat load regions 195, i.e., regions that experience higher temperatures and require more cooling compared to other regions of the blade. In the example shown, high heat load regions 195 include regions: near leading edge 128 (195A), pressure side outer wall 124 near trailing edge 130 (195B), and suction side wall 126 downstream of leading edge 128 (195C). At high heat load regions 195, a first spacing Z1 may be employed between integral impingement cooling structure 160 and inner surface 132, 154 at high heat load regions 195, while a second, larger spacing Z2 is used at other locations that do not have such a high heat load. In this manner, more cooling can be provided where necessary, i.e., at high heat load regions 195, using first spacing Z1 with the spacing increasing between impingement cooling structure 160 and inner surface 132, 154 to second, larger spacing Z2 for lower heat load regions. As shown in FIG. 9, the larger second spacing Z2 may allow coolant flow 136 to limit or reduce heat absorption as it moves downstream toward trailing edge 130, allowing coolant flow 136 to be cooler and have more heat absorbing capacity for downstream regions, e.g., serpentine cooling passage 200 and/or pin bank 206 (described herein). A transition between spacings Z1 and Z2 can be at any desired rate, e.g., gradual over a relatively long distance, abrupt at a particular location, or at any rate therebetween. Second spacing Z2 may be anywhere from, for example, 1.01 to 3.00 times first spacing Z1. The Z/D parameter can be customized for each region of concern. As noted, in one example, Z/D ranges from approximately 1 to approximately 10. In another example, Z/D may range from approximately 2 to approximately 6. Diameter D of cooling passages 172 can also be configured to customize the Z/D parameter for different regions.

FIG. 9 also shows turbine rotor blade 120 including one or more post-impingement target features 196 on inner surface 132. Post-impingement target features 196 may include any now known or later developed structure on inner surface 132 to promote cooling. In the example shown, impingement target features 192 include bumps, but they could include any structure. In one scenario, hollow body 162 may include a local bulge 198 to match impingement target feature(s) 196 contour, and thus maintain spacing Z (i.e., Z1 as shown). While two target features 196 and bulge 198 pairs are shown, any number may be employed. In one embodiment, post-impingement target features 196 may also optionally include additional integral cooling features, such as but not limited to film cooling holes 199. Film cooling holes 199 direct coolant flow 136, post-impingement with post-impingement target features 196, i.e., inner surface 132 thereof, to create a cooling film 201 over sidewall(s) 124, 126. Any number of film cooling holes 199 may be applied within each post-impingement cooling features 196.

Figure 10:
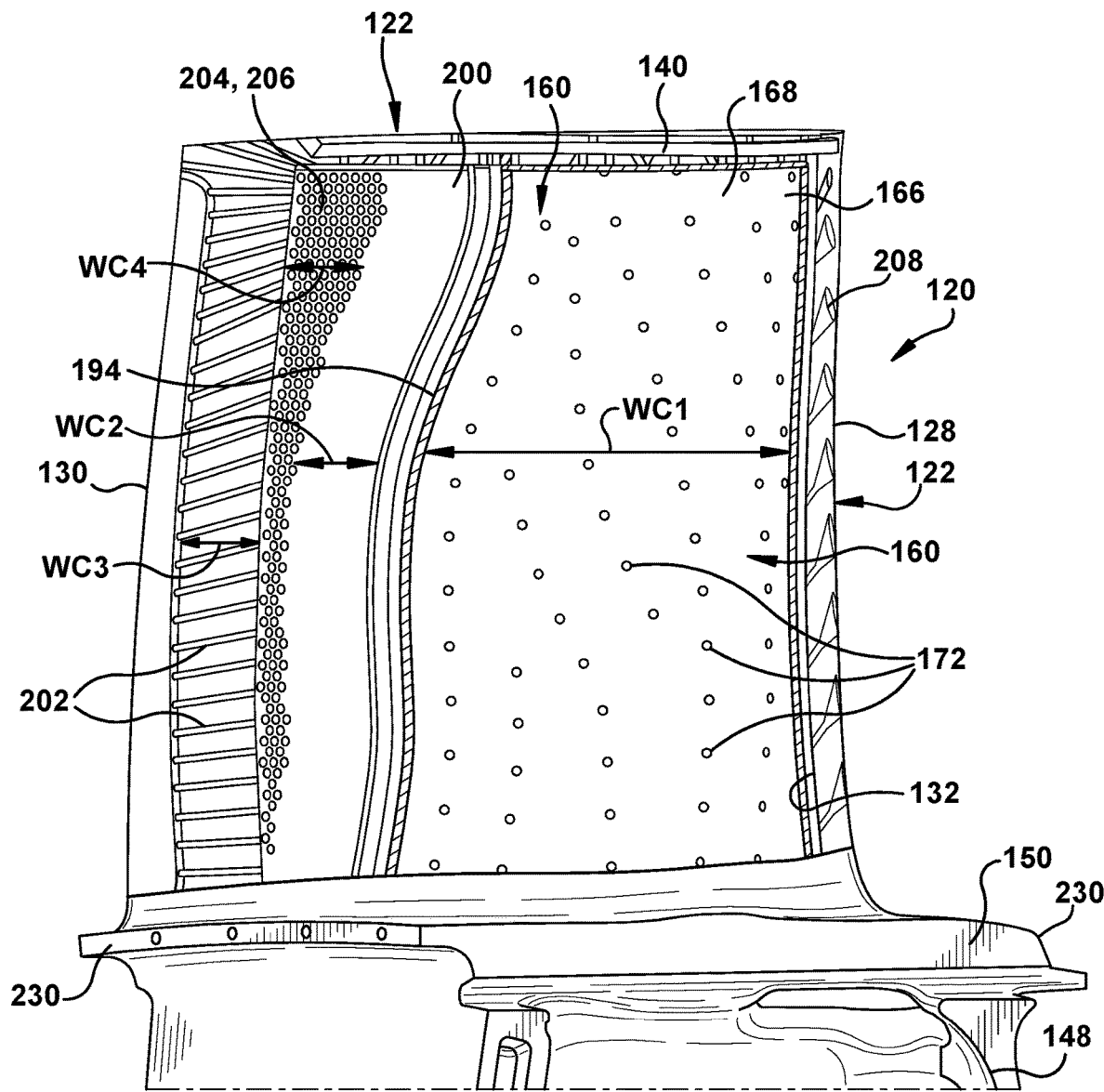
FIG. 10 shows a first partial axial cross-sectional view of a turbine rotor blade including an integral impingement sleeve, according to one embodiment of the disclosure.
Figure 11:
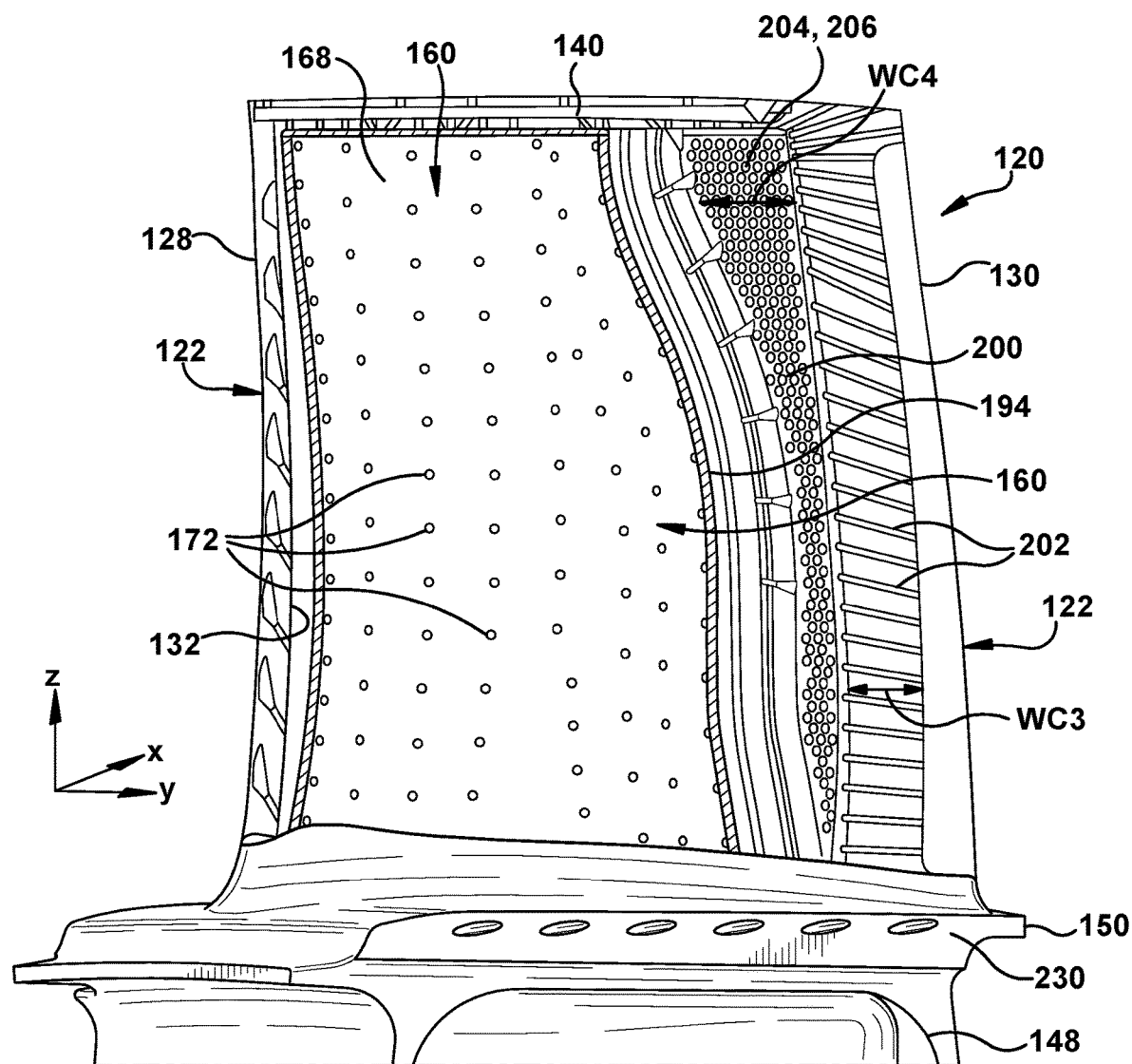
FIG. 11 shows a second partial axial cross-sectional view of a turbine rotor blade including an integral impingement sleeve, according to one embodiment of the disclosure.

FIG. 10 shows a first radial, cross-sectional view along view line 10-10 in FIG. 4, and FIG. 11 shows a second, radial cross-sectional view along view line 11-11 in FIG. 4, the latter of which is in a slightly different plane than FIG. 10 and in the opposite direction. As shown in FIG. 10, in certain embodiments, hollow body 162 has a chordwise width WC1 that is smaller near tip end 140 than shank 148. Most conventional impingement inserts have an opposite chordwise width arrangement to allow them to be inserted through an open tip end of the airfoil body. Further, hollow body 162 may have alternating wider and narrow chordwise widths WC1 over its radial span (up and down page in FIGS. 10-11). Consequently, an axially aft end 194 of hollow body 162 may vary in a chordwise location along a radial span of hollow body 162. In this manner, impingement cooling structure 160 can have a shape (chordwise width WC1) that curves over its radial span to be uniformly spaced from airfoil inner surface 132 and/or shank inner surface 154 (FIG. 5), regardless of the latter's shape. Conventional impingement inserts cannot provide such features.

As shown in FIGS. 4, 10 and 11, airfoil body 122 further includes at least one chordwise extending, serpentine cooling passage 200 extending from airfoil inner surface 132 aft of hollow body 162 toward trailing edge 130. As shown best in FIGS. 10 and 11, each chordwise extending, serpentine cooling passage 200 may have a same chordwise width WC2, e.g., shorter than chordwise width WC1 of hollow body 162. Airfoil body 122 may also include a plurality of radially spaced, trailing edge cooling passages 202 extending through trailing edge 130, i.e., from serpentine cooling passage(s) 200. Each of the plurality of trailing edge cooling passages 202 has a same chordwise width WC3, i.e., along a radial span of turbine rotor blade 120. As illustrated in FIGS. 10 and 11, a space 204 between trailing edge cooling passages 202 and serpentine cooling passage(s) 200 has a varying chordwise width WC4, i.e., along a radial span of turbine rotor blade 120. Turbine rotor blade 120 may further include a pin bank 206 between a forward end of plurality of trailing edge cooling passages 202 (right side thereof in FIG. 10, left side thereof in FIG. 11) and an aft end of chordwise extending, serpentine cooling passage(s) 200 (left side thereof in FIG. 10, right side thereof in FIG. 11). Consequently, as illustrated, in FIGS. 10-11, pin bank 206 may have the varying chordwise width WC4 along a radial span thereof. FIGS. 10 and 11 illustrate a variety of cooling features including but not limited to: film cooling via openings 208, main chord impingement cooling via impingement cooling structure 160, near trailing edge 130 cooling via serpentine cooling passage(s) 200, and trailing edge 130 pin bank cooling via pin bank 206.

Additive manufacturing (AM) includes a wide variety of processes of producing a component through the successive layering of material rather than the removal of material. As such, additive manufacturing can create complex geometries, such as those described herein relative to turbine rotor blade 120, without the use of any sort of tools, molds or fixtures, and with little or no waste material. Instead of machining components from solid billets of material, much of which is cut away and discarded, the only material used in additive manufacturing is what is required to shape the component. Additive manufacturing techniques typically include taking a three-dimensional computer aided design (CAD) file of the component (e.g., turbine rotor blade 120) to be formed, electronically slicing the component into layers, e.g., 18-102 micrometers thick, and creating a file with a two-dimensional image of each layer, including vectors, images or coordinates. The file may then be loaded into a preparation software system that interprets the file such that the component can be built by different types of additive manufacturing systems. In 3D printing, rapid prototyping (RP), and direct digital manufacturing (DDM) forms of additive manufacturing, material layers are selectively dispensed, sintered, formed, deposited, etc., to create the component. While other manufacturing processes such as casting may also be employed, turbine rotor blade 120 may be advantageously made by additive manufacturing.

In metal powder additive manufacturing techniques, such as direct metal laser melting (DMLM) (also referred to as selective laser melting (SLM)), direct metal laser sintering (DMLS), selective laser sintering (SLS), electron beam melting (EBM), and perhaps other forms of additive manufacturing, metal powder layers are sequentially melted together to form the component. More specifically, fine metal powder layers are sequentially melted after being uniformly distributed using an applicator on a metal powder bed. Each applicator includes an applicator element in the form of a lip, brush, blade or roller made of metal, plastic, ceramic, carbon fibers or rubber that spreads the metal powder evenly over the build platform. The metal powder bed can be moved in a vertical axis. The process takes place in a processing chamber having a precisely controlled atmosphere. Once each layer is created, each two dimensional slice of the component geometry can be fused by selectively melting the metal powder. The melting may be performed by a high powered melting beam, such as a 100 Watt ytterbium laser, to fully weld (melt) the metal powder to form a solid metal. The melting beam moves in the X-Y direction using scanning mirrors, and has an intensity sufficient to fully weld (melt) the metal powder to form a solid metal. The metal powder bed may be lowered for each subsequent two dimensional layer, and the process repeats until the component is completely formed. In order to create certain larger blades faster, some metal additive manufacturing systems employ a pair of high powered lasers that work together to form a blade. Here, a method of making turbine rotor blade 120 may include sequentially creating a layer of material and applying a heat source to sinter the layer of materials to form the structure described herein. Thus, additive manufacturing results in airfoil body 122, tip end 140, shank 148 and impingement cooling structure 160 including a plurality of integral material layers.

Turbine rotor blade 120 may be made of a metal which may include a pure metal or an alloy, capable of withstanding the environment in which employed. In one example, the metal may include practically any non-reactive metal powder, i.e., non-explosive or non-conductive powder, such as but not limited to: a cobalt chromium molybdenum (Co-CrMo) alloy, stainless steel, an austenite nickel-chromium based alloy such as a nickel-chromium-molybdenum-niobium alloy (NiCrMoNb) (e.g., Inconel 625 or Inconel 718), a nickel-chromium-iron-molybdenum alloy (NiCrFeMo) (e.g., Hastelloy® X available from Haynes International, Inc.), or a nickel-chromium-cobalt-molybdenum alloy (NiCrCoMo) (e.g., Haynes 282 available from Haynes International, Inc.), etc. In another example, the metal may include practically any metal such as but not limited to: tool steel (e.g., H13), titanium alloy (e.g., $Ti_6Al_4V$), stainless steel (e.g., 316L) cobalt-chrome alloy (e.g., CoCrMo), and aluminum alloy (e.g., $AlSi_{10}Mg$).

In contrast to conventional impingement inserts, first end 164 of hollow body 162 is integrally formed to shank inner surface 154, i.e., via additive manufacturing. Consequently, exterior surface 170 of hollow body 162 may be made to be uniformly spaced from inner surface(s) between first end 164 and second end 166 of hollow body 162, regardless of the curvature of, for example, airfoil inner surface 132 and/or shank inner surface 154. Further, hollow body 162 may have cooling passages 172 about an entirety of its periphery and radial span to provide impingement cooling throughout the blade, not just at a leading edge thereof. Hence, the integral impingement cooling structure 160 allows for maximum coverage of impingement with no sacrifices normally associated with impingement inserts, and can have a number of variable cooling features. For example, turbine rotor blade 120 may have: a variable chordwise width for the impingement cooling structure 160 (i.e., width WC1) or a pin bank 206 (i.e., WC4) aft of structure 160, a tailored impingement cooling structure 160, different wall thicknesses for different cooling and/or structural loads, and varied supports 186, 189 to address different coefficients of thermal expansion (CTE) between airfoil body 122 and impingement cooling structure 160. Additional cooling features, such as turbulators (not shown), may also be provided and customized around each cooling passage 172 to optimize impingement cooling. Turbine rotor blade 120 also may include axial venting through trailing edge 130, as described relative to FIGS. 10-11.

C. Platform with Cooling Passages Having Non-Linear Configuration

Figure 12:
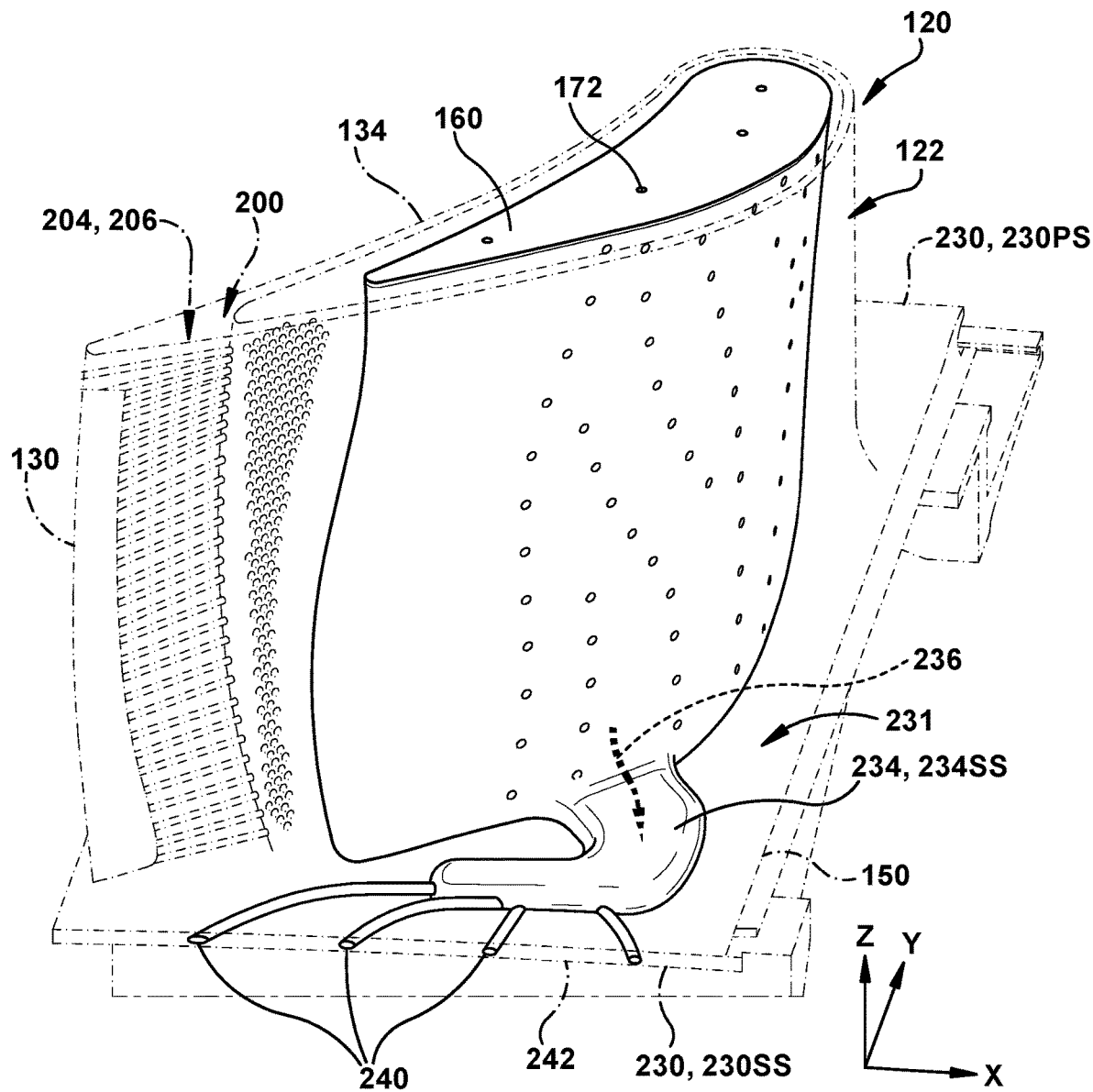
FIG. 12 shows a perspective view of a cooling passage in a platform of a turbine rotor blade, according to embodiments of the disclosure.
Figure 13:
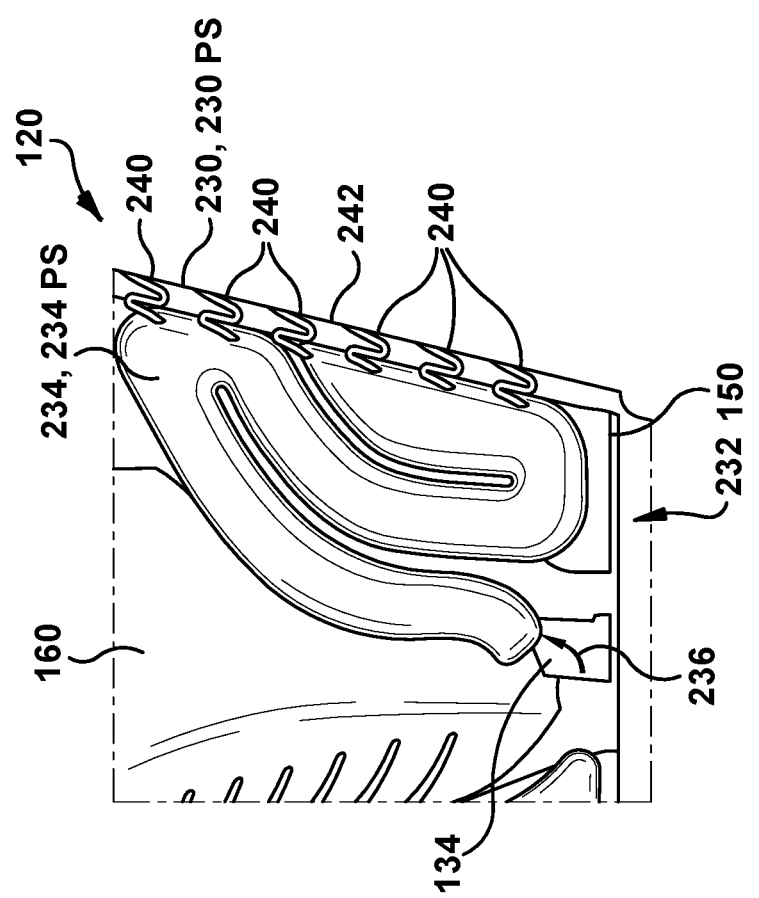
FIG. 13 shows a transparent plan view of a cooling passage in a side of a platform of a turbine rotor blade, according to embodiments of the disclosure.

Referring to FIGS. 12-18, another integral feature according to embodiments of the disclosure is illustrated. Similar to the previous embodiment, turbine rotor blade 120 may include airfoil body 122 with radially extending chamber 134 for receiving coolant flow 136. As shown best in FIGS. 3 and 10-13, platform 150 extends laterally outward relative to airfoil body 122 and terminates at at least one slash face 230 (e.g., FIGS. 11, 12). FIG. 12 shows a perspective, transparent view of a pressure side 232 of platform 150, and FIG. 13 shows a top down, transparent view of a suction side 231 of platform 150. As shown in FIGS. 12 and 13, a cooling circuit 234 is located within platform 150 and is in fluid communication with a source of coolant 236. Source of coolant 236 may take any of a variety of forms. In one example, where turbine rotor blade 120 includes impingement cooling structure 160 in radially extending chamber 134, source of coolant 236 to cooling circuit 234 may provide the coolant after passing through impingement cooling structure 160, i.e., the coolant is post-impingement coolant. In another embodiment, source of coolant 236 may be radially extending chamber 134. For example, where impingement cooling structure 160 is not provided, or it is provided radially outward of platform 150, source of the coolant 236 to cooling circuit 234 may provide the coolant directly from radially extending chamber 134. Other sources of coolant 236 may also be used, e.g., wheel space portion between shanks 148 of adjacent turbine rotor blades 120. Cooling circuit 234 may take any now known or later developed form. In the example shown in FIG. 13, cooling circuit 234 includes a sinusoidal path through platform 150. In contrast, in FIG. 12, cooling circuit 234 includes an elbow path. Cooling circuit 234 may have a less complex path or a more complex path, and may extend where necessary to cool platform 150.

Turbine rotor blade 120 also includes cooling passage(s) 240 from cooling circuit 234 through a surface 242 of slash face(s) 230, i.e., to cool slash faces 230 and other structure. Cooling passage(s) 240 are in platform 150 and in fluid communication with cooling circuit 234. In contrast to conventional, linear cooling passages, cooling passage(s) 240 extend in a non-linear configuration from cooling circuit 234 to exit through at least one slash face 230 of platform 150, providing improved cooling compared to linear cooling passages. For example, in FIG. 12, cooling passage(s) 240 have a (gently) curved shaped. Any number of cooling passage(s) 240 may be employed, to provide the desired cooling. Further, they may have any uniform or non-uniform cross-sectional shape desired, and may be uniformly or non-uniformly spaced, to provide the desired cooling. The non-linear configuration is made possible by, for example, additive manufacturing. As noted, airfoil body 122 and platform 150, including the parts that define cooling passages(s) 240, may include a plurality of integral material layers.

Figure 14:
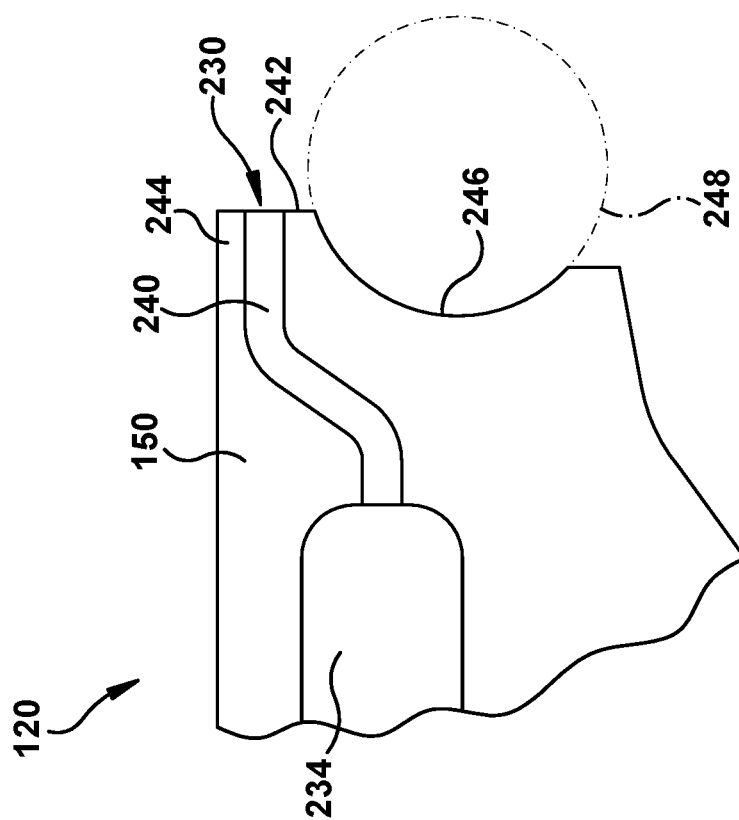
FIG. 14 shows an enlarged cross-sectional view of a cooling passage in a platform of a turbine rotor blade, according to embodiments of the disclosure.

FIG. 14 shows an enlarged cross-sectional view of a slash face 230. In some embodiments, as shown in FIG. 14, slash face(s) 230 may include an extension member 244. Extension member 244 may define a damper pin seat 246 configured to receive a damper pin 248 (shown in phantom) that seals with the damper pin seat of an adjacent turbine rotor blade (not shown). Where provided, cooling passage(s) 240 may extend through extension member 244. In this regard, cooling passage(s) 240 may have a non-linear configuration that extends from cooling circuit 234 radially outward and about damper pin seat 246 to outer surface 242 of slash face 230, i.e., in a curved shape that is sharper or more turning than FIG. 12.

Cooling passage(s) 240 may take any of a number of non-linear configurations to provide the desired cooling. The non-linear configuration, e.g., curved shape, may extend in any desired direction within platform 150, e.g., radially (inward or outward), axially (aft or forward) or circumferentially (clockwise or counterclockwise), or a combination of the directions. Cooling passage(s) 240 may all have the same shape to provide the same cooling attributes at each location where provided, or they may vary in shape within platform 150 to provide custom cooling for each location where they are provided. In addition to the curved shape shown in FIGS. 12 and 13, in another embodiment shown in FIG. 15, cooling passage(s) 240 may have a helical (corkscrew) shape, i.e., with a number of helical coils 250. Any number of helical coils 250 may be used for each cooling passage 240. As shown in FIGS. 13 and 16, cooling passage(s) 240 may have at least one first turn 252 (FIG. 16) in a first direction FD, and at least one second turn 254 (FIG. 16) in a second, opposite direction SD, creating a generally zig-zag path. Any number of first and second turns 252, 254 (FIG. 16) may be used for each cooling passage 240. As shown on the left side of FIG. 16, an amplitude A of each turn 252, 254 can be consistent so as to form a sinusoidal shape with the at least one first and second turns of equal amplitude A. Alternatively, as shown on the right side of FIG. 16, the amplitude of each turn 252, 254 can be inconsistent so as to form a more random zig-zag path with turns 252, 254. As also shown in the right side of FIG. 16, an input 260 and an exit 262 of each cooling passage 240 need not be aligned. In another embodiment, shown in FIG. 17, cooling passage(s) 240 may have a plurality of branches 264, e.g., like a tree. Any branching configuration may be employed.

FIG. 18 shows an embodiment in which cooling passage(s) 240 have a curved shape, e.g., more planar within platform 150 than in FIG. 12. FIG. 18 also illustrates exit 262 of cooling passage(s) 240 may meets slash face 230 of platform 150 at an angle α that is not 90°. In embodiment, angle α is less than 15°. Angle α may be customized to provide the desired cooling to platform 150 and/or film cooling to slash face 230. While shown separately, any of the cooling passage examples or aspects thereof may be combined with the other examples.

Cooling circuit 234 and cooling passage(s) 240 may be provided in pressure side 232 of platform alone (FIG. 13 alone), in suction side 231 of platform 150 alone (FIG. 12 alone), or in both sides 231, 232 of platform 150 (FIGS. 12-13). If provided on only one side of platform 150, any other conventional structure may be provided in the other side of the platform. In the latter case, as shown collectively in FIGS. 12 and 13, cooling circuit 234 may include a first portion 234SS in suction side 231 of platform 150 and a second portion 234PS on pressure side 232 of platform 150. Portions 234SS and 234PS may be separated or fluidly coupled. In this regard, slash face 230 includes a suction side slash face 230SS and a pressure side slash face 230PS. Here, cooling passage(s) 240 in platform 150 may include: at least one first cooling passage 240 in fluid communication with first portion 234SS of the cooling circuit and exiting suction side slash face 230SS, and at least one second cooling passage 240 in fluid communication with second portion 234PS of cooling circuit 234 and exiting pressure side slash face 230PS.

Non-linear cooling passages 240 allow coolant to be directed where needed in platform 150, in contrast to conventional, drilled linear coolant passages. The additive manufacture of coolant passages 140 allow them to have a wide variety of non-linear configurations that direct cooling where necessary and provide enhanced cooling through their shape.

D. Angel Wing with Coolant Transfer Passage

Figure 19:
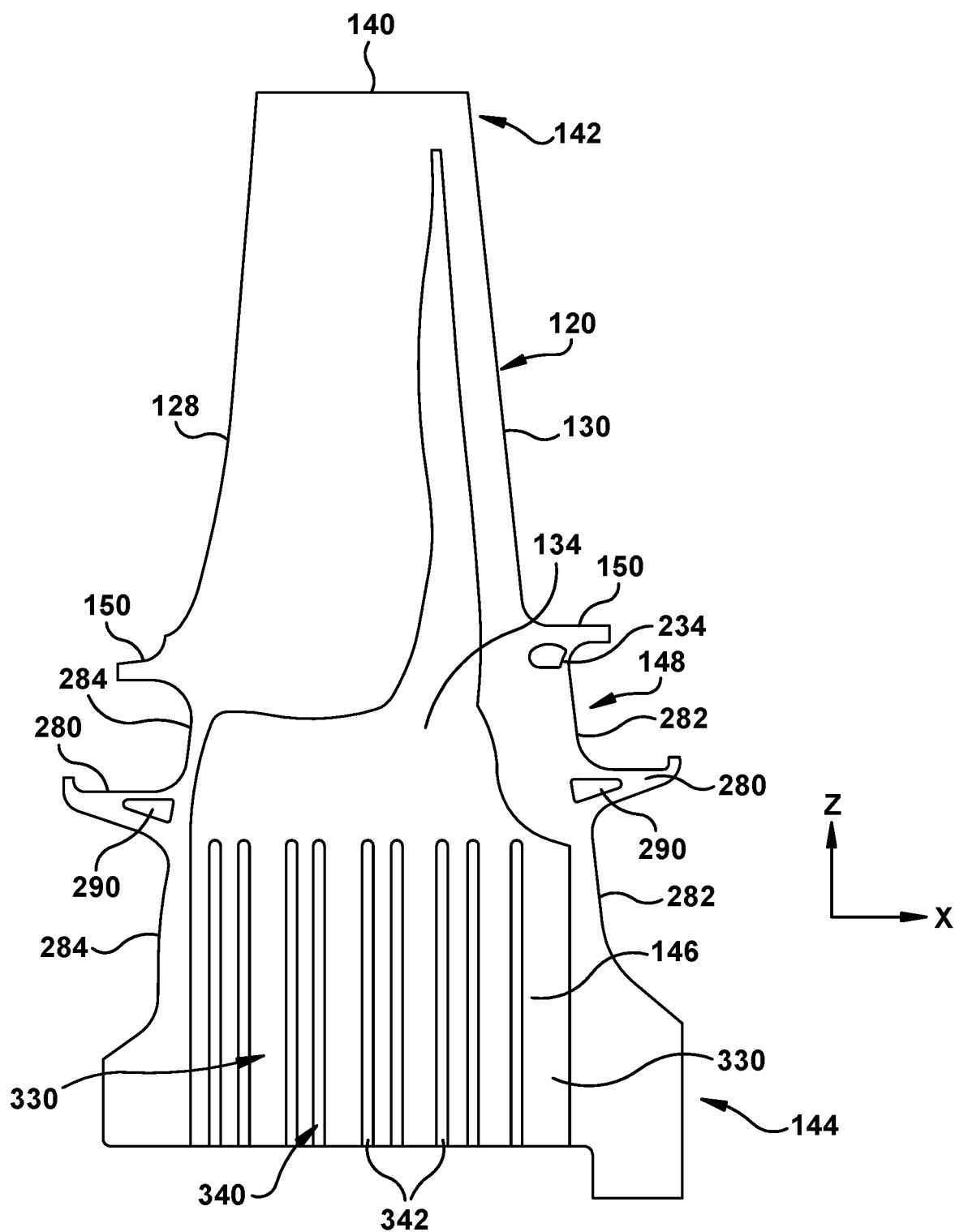
FIG. 19 shows a cross-sectional view of a turbine rotor blade including an angel wing, according to embodiments of the disclosure.
Figure 20:
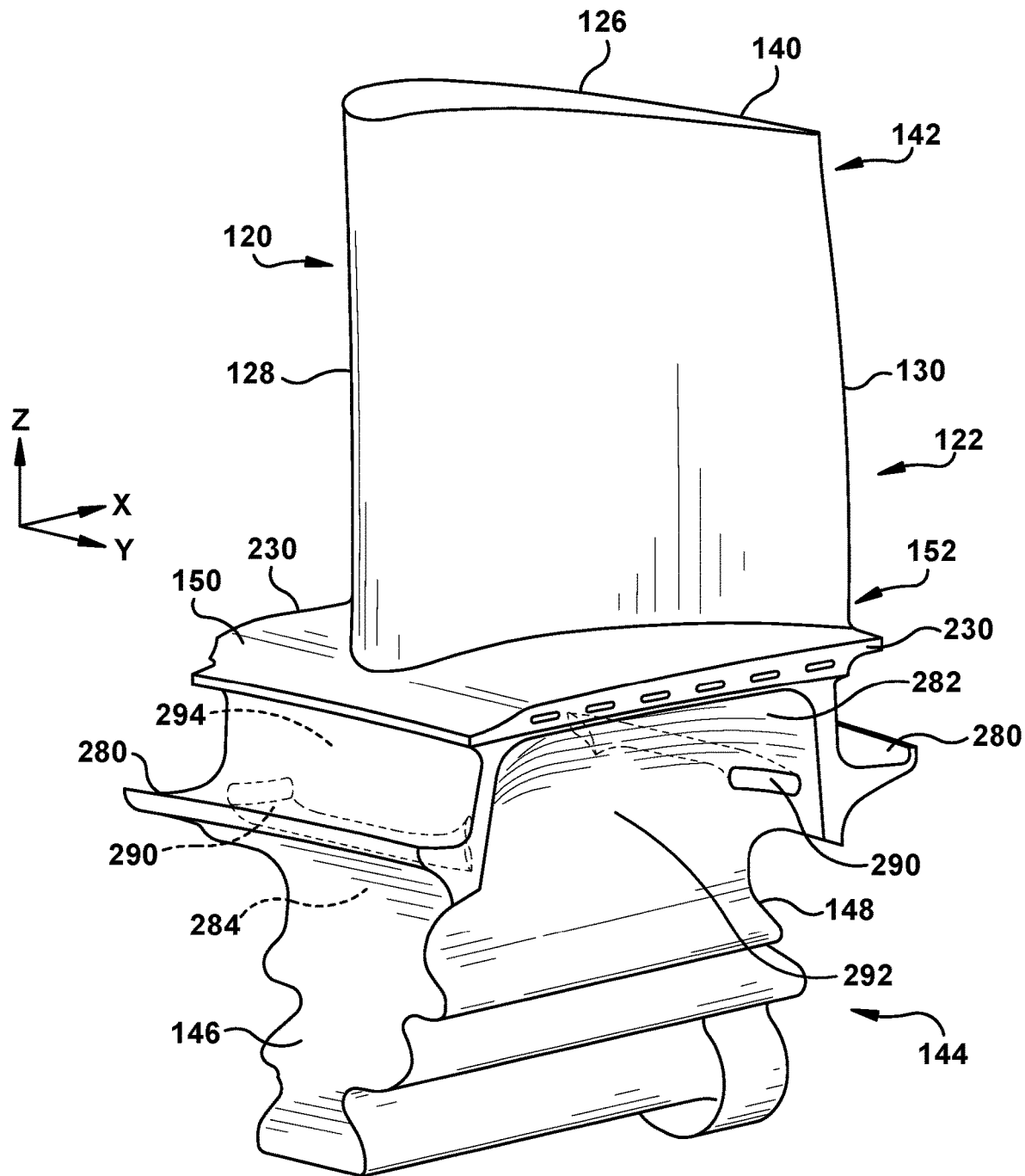
FIG. 20 shows a transparent, perspective view of a turbine rotor blade including an angel wing, according to embodiments of the disclosure.
Figure 22:
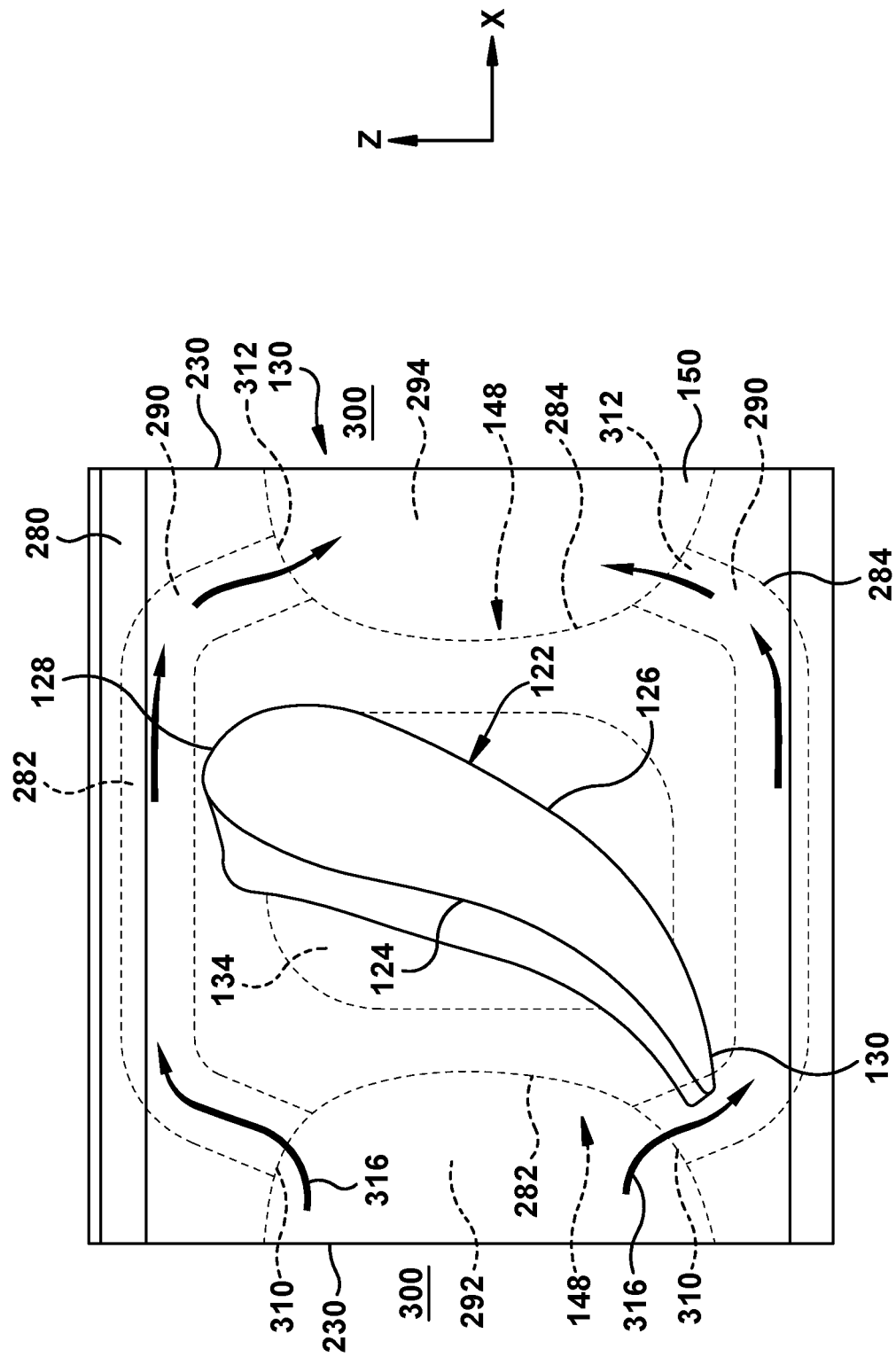
FIG. 22 shows a plan view a turbine rotor blade including an angel wing, according to embodiments of the disclosure.

Referring to FIGS. 2 and 19-22, another integral feature according to embodiments of the disclosure includes an angel wing 280 having a coolant transfer passage therein. FIG. 19 shows a radial cross-section through turbine rotor blade 120 including an angel wing 280, FIG. 20 shows a transparent perspective view of turbine rotor blade 120 including angel wing 280, FIG. 21 shows an axial view of a set of turbine rotor blades 120A-C including angel wing(s) 280, and FIG. 22 shows a top down view of a turbine rotor blade 120 including angel wings 280. With further respect to FIG. 21, a set of turbine rotor blades includes: a first turbine rotor blade 120A, a second turbine rotor blade 120B and a third turbine rotor blade 120C (collectively or individually, turbine rotor blade 120). First turbine rotor blade 120A is positioned between second and third turbine rotor blades 120B, 120C. In this embodiment, as shown in FIGS. 19-20, each turbine rotor blade 120 may include airfoil body 122 including concave pressure side outer wall 124 (FIG. 3) and convex suction side outer wall 126 (FIG. 3) that connect along leading and trailing edges 128, 130 (FIG. 3). Turbine rotor blade 120 may also include shank 148 at radial inner end 152 of airfoil body 122. In addition, turbine rotor blade 120 includes at least one angel wing 280 extending laterally from at least one side 282, 284 of shank 148.

As shown for one nozzle-blade interface in FIG. 2, an opening 286 exists at the interface between adjacent nozzles 112 and turbine rotor blades 120 that can allow hot working fluid to exit the hot gas path and enter a wheel space 300 of turbine 108. In order to limit this leakage of hot gas, turbine rotor blade 120 typically includes axially projecting angel wing seals 280, also simply referred to as 'angel wings'. Angel wings 280 cooperate with projecting segments or 'discouragers' 288 which extend from nozzle 112. Angel wings 280 and discouragers 288 overlap (or nearly overlap), but do not touch each other, thus restricting fluid flow.

Turning to FIGS. 19-22, in accordance with embodiments of the disclosure, turbine rotor blade 120 may also include a coolant transfer passage 290 defined through the at least one angel wing 280. Coolant transfer passage 290, e.g., for a first turbine rotor blade 120A (FIG. 21), fluidly couples a first wheel space portion 292 defined between shank 148A (FIG. 21) and a first adjacent shank 148B (FIG. 21) of a first adjacent turbine rotor blade 120B and a second wheel space portion 294 defined between shank 148A (FIG. 21) and a second adjacent shank 148C of a second adjacent turbine rotor blade 120C (FIG. 21). As shown best by observing FIGS. 2, 21 and 22, each wheel space portion 292, 294 is part of wheel space 300. Wheel space 300 is defined: circumferentially between shanks 148A-C (FIG. 21) of adjacent turbine rotor blades 120A-C, axially between shank 148 and an adjacent nozzle 112, and radially by platform 150 and rotor disks 147. Wheel space portions 292, 294 are that part of wheel space 300 that is axially beside a particular blade's shank 148.

As shown best in FIG. 22, coolant transfer passage 290 includes a first open end 310 in fluid communication with first wheel space portion 292 and a second open end 312 in fluid communication with second wheel space portion 294. Thus, coolant transfer passage 290 allows a wheel space coolant 316 to pass between wheel space portions 292, 294 on circumferentially opposing sides of shank 148. First open end 310 and second open end 312 may face in an axial-circumferential direction relative to airfoil body 122, or any direction that will allow wheel space coolant 316 to pass between wheel space portions 292, 294. Wheel space coolant 316 may be any now known or later developed coolant, e.g., routed from compressor 102 (FIG. 1). As noted previously, outer walls 124, 126 of airfoil body 122 define radially extending chamber 134 that may extend into shank 148. As shown in FIG. 22, coolant transfer passage 290 is fluidly isolated from radially extending chamber 134, i.e., coolant flow 136 (FIG. 4) from chamber 134 does not mix with wheel space coolant 316.

Figure 24:
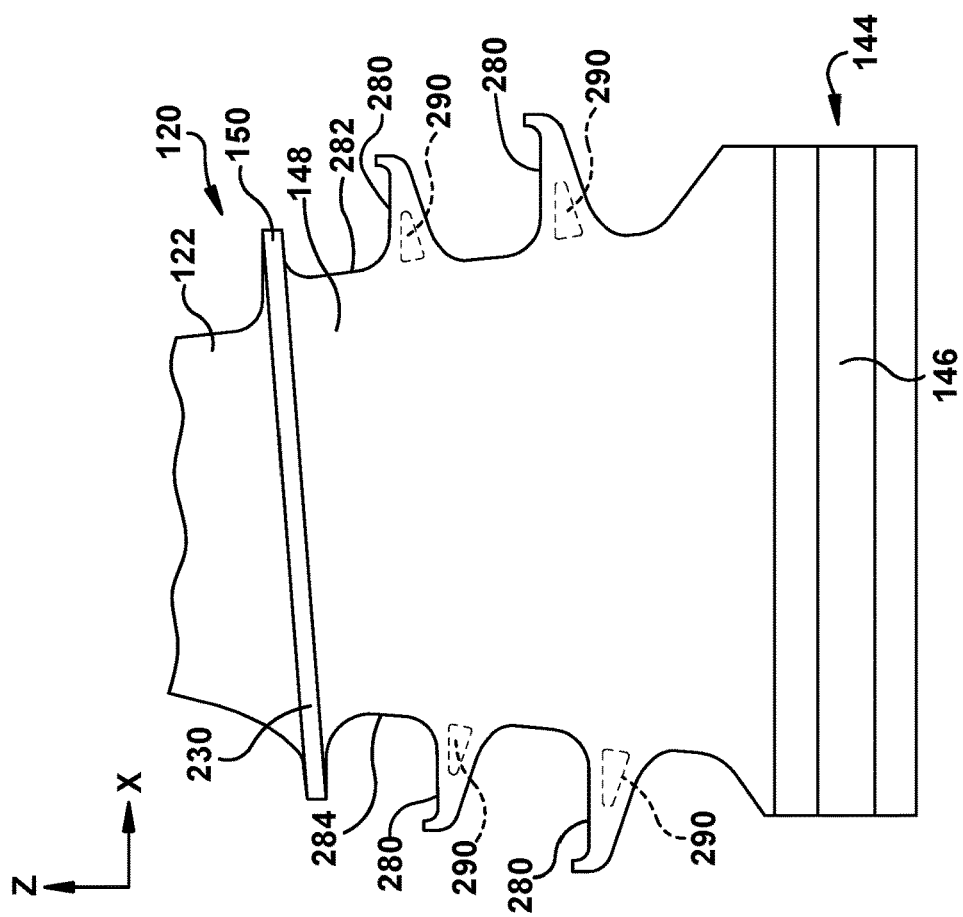
FIG. 24 shows a side view of a turbine rotor blade including an angel wing, according to embodiments of the disclosure.
Figure 23:
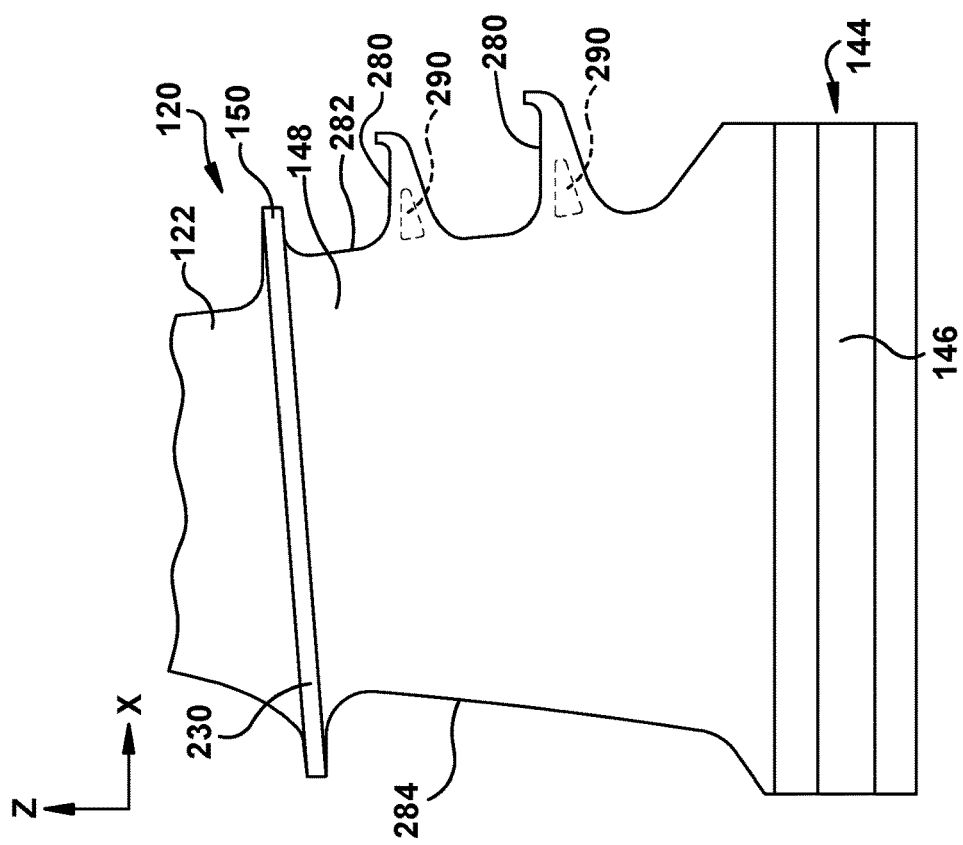
FIG. 23 shows a side view of a turbine rotor blade including an angel wing, according to embodiments of the disclosure.

Any number of angel wings 280 may be employed. In one example, shown in FIGS. 19, 20 and 22, a first angel wing 280 extends laterally from first side 282 of shank 148, and a second angel wing 280 extends laterally from a second, opposing side 284 of shank 148. In another example, shown in FIG. 23, a first pair of radially spaced angel wings 280 may extend laterally from first side 282 of shank 148, and none extend from side 284 of shank 148. In another embodiment, as shown in FIG. 24, a first pair of radially spaced angel wings 280 may extend laterally from first side 282 of shank 148, and a second pair of radially spaced angel wings 280 may extend laterally from a second, opposing side 284 of shank 148. In any event, each angel wing 280 may include a respective coolant transfer passage 290. Alternatively, while each angel wing 280 is shown including a coolant transfer passage 290, selective angel wings may not include a coolant transfer passage.

Coolant transfer passage 290 allows wheel space coolant 316 (FIG. 22) to move between wheel space portions 292, 294, allows cooling of angel wings 280, and reduces the weight turbine rotor blade 120.

E. Hollow Blade Mount with Lattice Support Structure

Referring to FIGS. 19, 20, 25 and 26, another integral feature according to embodiments of the disclosure includes a hollow blade mount 146. In this embodiment, root 144 is provided including shank 148 having radially extending chamber 134 defined therein. Blade mount 146 is at a radial inner end of shank 148. In contrast to many conventional blade mounts, blade mount 146 has a hollow interior 330 defined therein, e.g., by inner wall surfaces 344 of blade mount 146. Hollow interior 330 is in fluid communication with radially extending chamber 134. Hollow interior 330 may have any desired interior shape, e.g., expanding radially as shown in FIG. 25. Blade mount 146 may have any now known or later developed exterior shape configured for mounting to a rotor wheel 147 (FIG. 21) coupled to rotor 110 (FIG. 2), e.g., a dovetail, or fir tree shape.

Turbine rotor blade root 144 may further include a lattice support structure 340 disposed within hollow interior 330 of the blade mount 146. Lattice support structure 340 may take a variety of hollow support structure forms. In one example, lattice support structure 340 may include a plurality of radially extending V-shaped sections 342. V-shaped sections 342 may be integral with inner wall surfaces 344 of blade mount 146. Root 144 including shank 148 and blade mount 146, including lattice support structure 340, may be made by additive manufacture. Shank 148 and blade mount 146 thus may include a plurality of integral material layers.

Root 144 according to this embodiment, i.e., with lattice support structure 340, may also include platform 150, as described herein relative to FIGS. 12-18. Platform 150, as noted, is positioned radially outward of shank 148 and extends laterally outward relative to the shank, terminating at at least one slash face 230. Platform 150 may include cooling circuit 234 defined within the platform and in fluid communication with a source of a coolant flow, e.g., radially extending chamber 134. Cooling passage(s) 240 (FIGS. 12-18) may be defined in platform 150 and in fluid communication with cooling circuit 234. As noted, cooling passage(s) 240 extending in a non-linear configuration from cooling circuit 234 to exit through slash face(s) 230 of the platform. Slash face(s) 230 may include extension member 244 through which cooling passage(s) 240 extend. Cooling passage(s) 240 may have: a helical shape (FIG. 15); at least one first turn in a first direction, and at least one second turn in a second, opposite direction (FIG. 16); a plurality of branches (FIG. 17); or a curved shape (e.g., FIGS. 12, 14, 18).

Root 144 according to this embodiment, i.e., with lattice support structure 340, may also include angel wing(s) 280 extending laterally from at least one side of shank 148, as described herein relative to FIGS. 19-24. As noted, a coolant transfer passage 290 may be defined through angel wing(s) 280. As shown in FIG. 21, coolant transfer passage 290 fluidly couples a first wheel space portion 292 defined between shank 148A and a first adjacent shank 148B of a first adjacent turbine rotor blade root 144B and a second wheel space portion 294 defined between shank 148A and a second adjacent shank 148C of a second adjacent turbine rotor blade root 144C. Coolant transfer passage 290 includes a first open end 310 in fluid communication with first wheel space portion 292 and a second open end 312 in fluid communication with second wheel space portion 294. As shown in FIG. 22, first open end 310 and second open end 312 may face in a circumferential direction relative to shank 148. Coolant transfer passage 290 may be fluidly isolated from radially extending chamber 134 in shank 148.

Root 144 according to this embodiment, i.e., with lattice support structure 340, may also include both platform 150 and angel wing(s) 280, as described herein. Additive manufacture allows for formation of root 144 with shank 148, hollow blade mount 146, lattice support structure 340, and platform 150 and/or angel wing(s) 280, creating a plurality of integral material layers for whatever features are provided.

Root 144 including integral lattice support structure 340 in hollow interior 330 of blade mount 146 provides a lighter turbine rotor blade 120, and additional cooling of blade mount 146.

While the various embodiments have been described and illustrated herein as used together, it is understood that the various embodiments can be used alone or in a combination.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" as applied to a particular value of a range applies to both end values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A turbine rotor blade, comprising:
an airfoil body including a concave pressure side outer wall and a convex suction side outer wall that connect along leading and trailing edges, the concave pressure side and the convex suction side outer walls having an airfoil inner surface defining a radially extending chamber for receiving a coolant flow;
wherein the airfoil body further includes at least one chordwise extending, serpentine cooling passage;
a plurality of radially spaced, trailing edge cooling passages extending through the trailing edge;
a space between the plurality of trailing edge cooling passages and the at least one chordwise extending, serpentine cooling passage, wherein the space has a varying chordwise width along a radial span thereof;
a tip end at a radial outer end of the airfoil body;
a shank at a radial inner end of the airfoil body, the radially extending chamber extending at least partially into the shank to define a shank inner surface; and
an impingement cooling structure within the radially extending chamber, the impingement cooling structure including:
a hollow body including a first end, a second end, an interior surface and an exterior surface, and
a plurality of cooling passages through the hollow body and in fluid communication with the radially extending chamber to allow the coolant flow to pass from the interior surface of the hollow body to impinge on at least the airfoil inner surface,
wherein the first end of the hollow body is integrally formed to the shank inner surface,
wherein a first chordwise width of the hollow body at the tip end is less than a second chordwise width of the hollow body at the shank, and
wherein the exterior surface of the hollow body is uniformly spaced from the airfoil inner surface between the first end and the second end of the hollow body.

2. The turbine rotor blade of claim 1, wherein the second end of the hollow body is integrally formed to an inner surface of the tip end.

3. The turbine rotor blade of claim 1, wherein the first end of the hollow body extends substantially in a radial direction relative to a meeting location of the first end of the hollow body and the shank inner surface.

4. The turbine rotor blade of claim 3, wherein at least a portion of the shank inner surface extends at an angle relative to the radial direction from the meeting location of the first end of the hollow body and the shank.

5. The turbine rotor blade of claim 3, further comprising:
a platform between the shank and the radial inner end of the airfoil body, the platform extending laterally outward relative to the shank, and
a support structure between the first end of the hollow body and the shank inner surface, the support structure positioned radially outward of the meeting location and radially inward of the platform.

6. The turbine rotor blade of claim 1, further comprising a platform between the shank and the radial inner end of the airfoil body, the platform extending laterally outward relative to the shank,
wherein the first end of the hollow body is integrally formed to the shank inner surface radially inward of the platform.

7. The turbine rotor blade of claim 1, wherein the hollow body includes at least one first portion having a first wall thickness between the interior surface and the exterior surface thereof, and at least one second portion having a second wall thickness between the interior surface and the exterior surface thereof, the first wall thickness being greater than the second wall thickness.

8. The turbine rotor blade of claim 7, further comprising a support on the exterior surface of the hollow body in the at least one second portion having the second wall thickness, the support integrally formed with the hollow body to space the exterior surface of the hollow body from the airfoil inner surface between the first end and the second end of the hollow body,
wherein the support includes a passage therethrough in fluid communication with one of the plurality of cooling passages.

9. The turbine rotor blade of claim 1, further comprising a support on the exterior surface of the hollow body, the support integrally formed with the hollow body to space the exterior surface of the hollow body from the airfoil inner surface between the first end and the second end of the hollow body.

10. The turbine rotor blade of claim 1, further comprising a reinforcement member surrounding at least one of the plurality of cooling passages.

11. The turbine rotor blade of claim 1, wherein the airfoil body, the tip end, the shank and the impingement cooling structure include a plurality of integral material layers.

12. The turbine rotor blade of claim 1, further comprising a stiffener rib integrally formed to the interior surface of the hollow body.

13. The turbine rotor blade of claim 1, wherein the plurality of cooling passages through the hollow body and in fluid communication with the radially extending chamber extend around an entire peripheral extent of the hollow body.

14. The turbine rotor blade of claim 1, wherein an axially aft end trailing edge portion of the hollow body varies in a chordwise location along a radial span of the hollow body, and wherein each chordwise extending, serpentine cooling passage of the at least one chordwise extending, serpentine cooling passages has a same chordwise width.

15. The turbine rotor blade of claim 14, wherein each of the plurality of trailing edge cooling passages has a same chordwise width.

16. The turbine rotor blade of claim 15, wherein the airfoil body further includes a pin bank between a forward end of the plurality of trailing edge cooling passages and an aft end of the at least one chordwise extending, serpentine cooling passage, wherein the pin bank has a varying chordwise width along a radial span thereof.

17. An additively manufactured turbine rotor blade, comprising:
- an airfoil body including:
  - a concave pressure side outer wall and a convex suction side outer wall that connect along leading and trailing edges, the concave pressure side and the convex suction side outer walls having an airfoil inner surface defining a radially extending chamber for receiving a coolant flow;
  - at least one chordwise extending, serpentine cooling passage;
  - a plurality of radially spaced, trailing edge cooling passages extending through the trailing edge, wherein each of the plurality of trailing edge cooling passages has a same chordwise width;
  - a space between the plurality of trailing edge cooling passages and the at least one chordwise extending, serpentine cooling passage, wherein the space has a varying chordwise width along a radial span thereof;
  - a pin bank between a forward end of the plurality of trailing edge cooling passages and an aft end of the at least one chordwise extending, serpentine cooling passage, wherein the pin bank has a varying chordwise width along a radial span thereof; and
- an integral impingement cooling structure within the radially extending chamber, the integral impingement cooling structure including:
  - a hollow body including a first end, a second end, an interior surface and an exterior surface, and
  - a plurality of cooling passages through the hollow body and in fluid communication with the radially extending chamber to allow the coolant flow to pass from the interior surface of the hollow body to impinge on at least the airfoil inner surface,
  - wherein the exterior surface of the hollow body is uniformly spaced from the airfoil inner surface between the first end and the second end of the hollow body.

18. The additively manufactured turbine rotor blade of claim 17, wherein the plurality of cooling passages through the hollow body are in fluid communication with the radially extending chamber extend around an entire peripheral extent of the hollow body.

19. The additively manufactured turbine rotor blade of claim 17, wherein the second end of the hollow body is integrally formed to an inner surface of the tip end of the airfoil body.

20. The additively manufactured turbine rotor blade of claim 17, further comprising a tip end at a radial outer end of the airfoil body and a shank at a radial inner end of the airfoil body, the radially extending chamber extending at least partially into the shank to define a shank inner surface, wherein a first chordwise width of the hollow body at the tip end is less than a second chordwise width of the hollow body at the shank.

* * * * *